US005567777A

United States Patent [19]
Tsuji et al.

[11] Patent Number: 5,567,777
[45] Date of Patent: Oct. 22, 1996

[54] CYCLOOLEFIN COPOLYMER COMPOSITION AND METHOD FOR THE PREPARATION THEREOF

[75] Inventors: Yoichiro Tsuji; Yoshiharu Abe; Toshihiro Sagane; Toshimasa Takata, all of Kuga-gun, Japan

[73] Assignee: Mitsui Petrochemical Industries, Ltd., Tokyo, Japan

[21] Appl. No.: 589,599

[22] Filed: Jan. 26, 1996

Related U.S. Application Data

[63] Continuation of Ser. No. 185,846, filed as PCT/JP93/00685, May 24, 1993 published as WO93/24567, Dec. 9, 1993, abandoned.

[30] Foreign Application Priority Data

May 26, 1992 [JP] Japan ................. 4-133821
May 26, 1992 [JP] Japan ................. 4-133822

[51] Int. Cl.$^6$ ................. C08L 45/00; C08L 23/16
[52] U.S. Cl. ................. 525/289; 525/290; 525/210; 525/211
[58] Field of Search ................. 525/289, 290, 525/210, 211

[56] References Cited

U.S. PATENT DOCUMENTS

| 3,873,644 | 3/1975 | Pampus et al. ................. 260/879 |
| 4,418,178 | 11/1983 | DeWitt ................. 525/97 |
| 4,614,778 | 9/1986 | Kajiura et al. . | |
| 4,918,133 | 4/1990 | Moriya et al. ................. 525/210 |
| 4,992,511 | 2/1991 | Yamamoto et al. ................. 525/211 |
| 5,128,446 | 7/1992 | Hagashi et al. ................. 525/210 |
| 5,179,171 | 1/1993 | Minami et al. . | |
| 5,218,049 | 6/1993 | Yamamoto et al. ................. 525/211 |
| 5,239,006 | 8/1993 | Sagane et al. ................. 525/211 |

FOREIGN PATENT DOCUMENTS

| 6198780 | 10/1984 | Japan . |
| 61115916 | 11/1984 | Japan . |
| 61-120816 | 6/1986 | Japan . |
| 3255145 | 11/1991 | Japan . |

OTHER PUBLICATIONS

Manson et al—Polymer Blends & Composites—pp. 116–117 1976.

*Primary Examiner*—Carman J. Seccuro, Jr.
*Attorney, Agent, or Firm*—Sherman and Shalloway

[57] ABSTRACT

Provided are cycloolefin copolymer compositions comprising a hydrocarbon elastomer component substantially free from a polymerizable double bond and a cycloolefin random copolymer component obtained by copolymerization of an α-olefin of at least 2 carbon atoms and a cycloolefin in the presence of said hydrocarbon elastomer component, said composition containing said hydrocarbon elastomer component in an amount of 1–50% by weight, and a method for preparing said cycloolefin copolymer compositions.

Also provided are cycloolefin copolymer compositions comprising a hydrocarbon elastomer component having a polymerizable double bond and a cycloolefin copolymer component obtained by copolymerization of an α-olefin of at least 2 carbon atoms and a cycloolefin in the presence of said hydrocarbon elastomer component, said composition containing said hydrocarbon elastomer component in an amount of 1–50% by weight.

Such cycloolefin copolymer compositions as mentioned above are excellent in transparency and mechanical strength and also excellent particularly in impact resistance.

In particular, when a cycloolefin elastomer obtained by copolymerization of an α-olefin of at least 2 carbon atoms, a cycloolefin and a non-conjugated diene of 5–20 carbon atoms is used as the above-mentioned hydrocarbon elastomer component having a polymerizable double bond, the resulting copolymer compositions are excellent particularly in transparency.

4 Claims, No Drawings

CYCLOOLEFIN COPOLYMER COMPOSITION AND METHOD FOR THE PREPARATION THEREOF

This application is a continuation of application Ser. No. 08/185,846, filed as PCT/JP93/00685, May 24, 1993, published as WO93/24567, Dec. 9, 1993, now abandoned.

FIELD OF INDUSTRIAL APPLICATION

This invention relates to cycloolefin copolymer compositions and methods for the preparation thereof, and more particularly the invention relates to cycloolefin copolymer compositions excellent in impact-resistance and heat resistance and methods for the preparation thereof.

TECHNOLOGICAL BACKGROUND

It has heretofore been known that cycloolefin random copolymers obtained by copolymerization of ethylene and cycloolefins, such as tetracyclododecene, are synthetic resins which are excellent in transparency, and also well balanced among heat resistance, thermal aging resistance, chemical resistance, solvent resistance, dielectric characteristics and rigidity. Such cycloolefin random copolymers as mentioned above are known to exhibit excellent performance in the field of optical materials such as optical memory disc and optical fiber. (See, for example, Japanese Patent L-O-P Publns. Nos. 168708/1985, 98780/1986, 115912/1986, 115916/1986, 120816/1986 and 252407/1987).

The cycloolefin random copolymers referred to hereinabove are synthetic resins which are particularly excellent in heat resistance, rigidity and transparency, however, their impact resistance is not always sufficient, and hence a further improvement in their impact resistance is required.

By the way, the present applicant has proposed by way of Japanese Patent L-O-P Publn. No. 255145/1991 resin compositions comprising a cycloolefin random copolymer obtained by copolymerization of ethylene and cycloolefins, such as tetracyclododecene, and an elastomeric polymer (rubber). However, the impact resistance of this resin composition is not always sufficient for the requirements as intended, though the resin composition is improved in impact resistance in comparison with the cycloolefin random copolymer prior to blending with the elastomeric polymer.

The reason why the resin composition obtained generally by melt blending the cycloolefin random copolymer and elastomeric polymer by means of a Brabender Plasti-Corder or an extruder has not sufficiently been improved in impact resistance is considered ascribable to the fact that the compatibility of the cycloolefin random copolymer with the elastomeric polymer is not always favorable.

With the view of solving such problem associated with the prior art as mentioned above, the present inventors prosecuted extensive researches on this subject, whereby they have found that (1) a cycloolefin copolymer composition obtained by copolymerization of an α-olefin having at least 2 carbon atoms, such as ethylene, and a cycloolefin in the presence of a hydrocarbon elastomer substantially free from a polymerizable double bond, said composition containing a specific amount of the above-mentioned hydrocarbon elastomer substantially free from the polymerizable double bond, and (2) a cycloolefin copolymer composition obtained by copolymerization of an α-olefin having at least 2 carbon atoms, such as ethylene, and a cycloolefin in the presence of a hydrocarbon elastomer having a polymerizable carbon-carbon double bond, said composition containing a specific amount of the above-mentioned hydrocarbon elastomer having the polymerizable carbon-carbon double bond, have excellent impact resistance, and eventually they have accomplished the present invention.

Further, it has been found also that particularly in the case of (2) mentioned above, when a cycloolefin elastomer is used as the hydrocarbon elastomer having the polymerizable carbon-carbon double bond, the resulting cycloolefin random copolymer composition becomes excellent in impact resistance, while maintaining excellent transparency inherent in cycloolefin random copolymers.

OBJECT OF THE INVENTION

The present invention has been made in view of the problem associated with the prior art as mentioned above, and an object of the invention is to provide cycloolefin copolymer compositions having excellent characteristics of the cycloolefin random copolymer and improved particularly in impact resistance, and methods for the preparation of said compositions.

SUMMARY OF THE INVENTION

The first cycloolefin copolymer composition of the invention is characterized by comprising

[A] a hydrocarbon elastomer (A-1) component substantially free from a polymerizable double bond, and having an intrinsic viscosity [η], as measured in decalin at 135° C., of from 0.05 to 10 dl/g and a glass transition temperature (Tg) of less than 10° C., and

[B] a cycloolefin random copolymer (B-1) component obtained by copolymerization of (a) an α-olefin of at least 2 carbon atoms and (b) a cycloolefin represented by the following formula [I] or [II] in the presence of the abovementioned hydrocarbon elastomer (A-1) component, said composition containing the abovementioned hydrocarbon elastomer (A-1) component in an amount of 1–50% by weight.

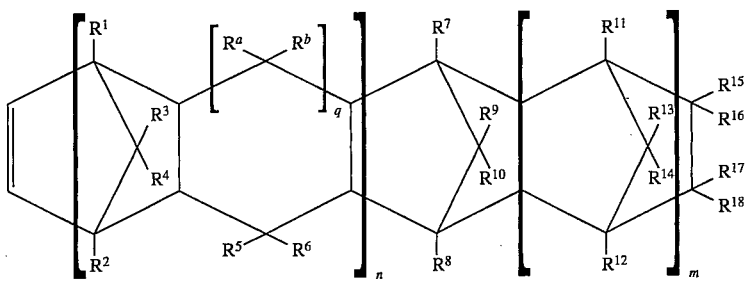

wherein n is 0 or 1; m is 0 or a positive integer; q is 0 or 1; $R^1$–$R^{18}$, $R^a$ and $R^b$ are each independently a hydrogen atom, a halogen atom or a hydrocarbon group; $R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group;

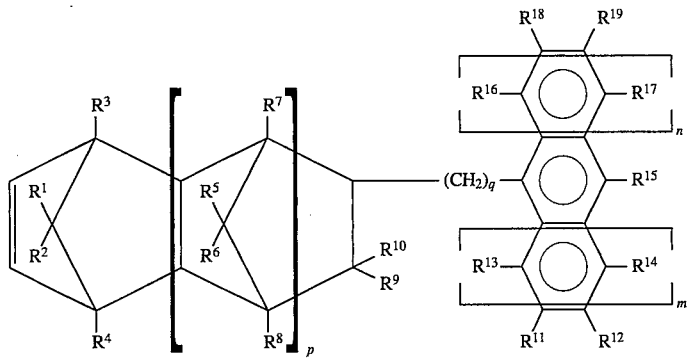

wherein each p and q is independently 0 or an integer of 1 or more; each of m and n is independently 0, 1 or 2; $R^1$–$R^{19}$ are each independently a hydrogen atom, a halogen atom, an aliphatic hydrocarbon group, an alicyclic hydrocarbon group, an aromatic hydrocarbon group or an alkoxy group; a carbon atom to which $R^9$ (or $R^{10}$) is linked and a carbon atom to which $R^{13}$ or $R^{11}$ is linked may be bonded directly or by way of an alkylene group of 1–3 carbon atoms, and $R^{15}$ and $R^{12}$ or $R^{15}$ and $R^{19}$ may be linked together to form a monocyclic or polycyclic aromatic ring when each of n and m is 0.

The method for the preparation of cycloolefin copolymer compositions in accordance with the present invention comprises copolymerizing (a) an α-olefin of at least 2 carbon atoms and (b) a cycloolefin represented by the aforementioned formula [I] or [II] in a liquid phase in the presence of a hydrocarbon elastomer substantially free from a polymerizable double bond and having an intrinsic viscosity [η], as measured in decalin at 135° C., of 0.05–10 dl/g and a glass transition temperature (Tg) of less than 10° C. to obtain a composition containing the above-mentioned hydrocarbon elastomer (A-1) component in an amount of 1–50% by weight.

The second cycloolefin copolymer composition of the invention is characterized by

[A] a hydrocarbon elastomer (A-2) component having an intrinsic viscosity [η], as measured in decalin at 135° C., of 0.05–10 dl/g, a glass transition temperature (Tg) of less than 10° C., a polymerizable double bond, and an iodine value of 2–30 (g-iodine/100 g-polymer), and

[B] a cycloolefin random copolymer (B-2) component obtained by copolymerizing (a) an α-olefin of at least 2 carbon atoms and (b) a cycloolefin represented by aforementioned formula [I] or [II] in the presence of the aforementioned hydrocarbon elastomer (A-2) component, said composition containing said hydrocarbon elastomer (A-2) component in an amount of 1–50% by weight.

In the second cycloolefin copolymer composition of the invention as mentioned above, it is desirable that the aforementioned hydrocarbon elastomer (A-2) is a cycloolefin elastomer (A-3) obtained by copolymerizing (i) an α-olefin of at least 2 carbon atoms, (ii) a cycloolefin represented by the aforesaid formula [I] or [II] and (iii) a non-conjugated diene having 5–20 carbon atoms, and containing a structural unit derived from the above-mentioned cycloolefin in an amount of at least 3 mol % and having an intrinsic viscosity [η], as measured in decalin at 135° C., of 0.5–5.0 dl/g, a glass transition temperature (Tg) of less than 10° C., a polymerizable carbon-carbon double bond and an iodine value of 2–30 (g-iodine/100 g-polymer), said composition containing the above-mentioned cycloolefin elastomer (A-3) component in an amount of 8–40% by weight.

Such cycloolefin copolymer compositions as mentioned above have characteristics inherent in cycloolefin random copolymer, that is, excellent transparency, chemical resistance and rigidity, and are excellent particularly in impact resistance.

Further, the cycloolefin copolymer compositions of the present invention are excellent particularly in transparency when the cycloolefin elastomer (A-3) is used as the aforementioned hydrocarbon elastomer having a polymerizable carbon-carbon double bond.

DETAILED DESCRIPTION OF THE INVENTION

The cycloolefin copolymer compositions of the present invention and the methods for the preparation thereof are illustrated below in detail.

The first cycloolefin copolymer composition

The first cycloolefin copolymer compositions of the invention are obtained by copolymerization of an α-olefin (a) of at least 2 carbon atoms and a cycloolefin (b) represented by the formula [I] or [II] in the presence of a hydrocarbon elastomer (A-1) substantially free from a polymerizable double bond.

First, the hydrocarbon elastomer substantially free from a polymerizable double bond is illustrated hereinafter.

Hydrocarbon elastomer (A-1)

The hydrocarbon elastomer (A-1) used in the invention is an elastomer substantially free from polymerizable double bond, and includes concretely (i) an α-olefin copolymer and (ii) an α-olefin/cycloolefin copolymer.

Hereinafter, these hydrocarbon elastomers (A-1) are illustrated more in detail.

(i) α-olefin copolymer

The α-olefin copolymer is a random copolymer obtained from at least two kinds of α-olefins.

Examples of the α-olefin include α-olefin of 2 to 20 carbon atoms, such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

Concrete examples of the α-olefin copolymer include ethylene/propylene copolymer, ethylene/1-butene copolymer, ethylene/1-pentene copolymer, ethylene/1-hexene copolymer, ethylene/4-methyl-1-pentene copolymer, ethylene/1-octene copolymer, ethylene/1-decene copolymer, ethylene/1-dodecene copolymer, ethylene/1-tetradecene copolymer, ethylene/1-hexadecene copolymer, ethylene/1-octadecene copolymer, ethylene/1-eicosene copolymer, propylene/1-butene copolymer, propylene/1-pentene copolymer, propylene/1-hexene copolymer, propylene/4-methyl-1-pentene copolymer, propylene/1-octene copolymer, propylene/1-decene copolymer, propylene/1-dodecene copolymer, propylene/1-tetradecene copolymer, propylene/1-hexadecene copolymer, propylene/1-octadecene copolymer and propylene/1-eicosene copolymer.

It is desired that the α-olefin copolymer has an intrinsic viscosity [η], as measured in decaline at 135° C., of 0.05 to 10 dl/g, preferably 0.1 to 5 dl/g, and a glass transition temperature (Tg) of less than 10° C., preferably not greater than 0° C.

(ii) α-olefin/cycloolefin copolymer

The α-olefin/cycloolefin copolymer is a random copolymer formed from at least one kind of α-olefin and a cycloolefin.

Examples of the α-olefin include α-olefin of 2 to 20 carbon atoms, such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

The cycloolefin includes the cycloolefin represented by the later described formula [I] or [II].

Concrete examples of the α-olefin/cycloolefin copolymer include ethylene/norbornene copolymer, ethylene/5-methyl-2-norbornene copolymer, ethylene/5-ethyl-2-norbornene copolymer, ethylene/5-propyl-2-norbornene copolymer, ethylene/5-butyl-2-norbornene copolymer, ethylene/5-pentyl-2-norbornene copolymer, ethylene/5-hexyl-2-norbornene copolymer, ethylene/5-heptyl-2-norbornene copolymer, ethylene/5-octyl-2-norbornene copolymer, ethylene/5-nonyl-2-norbornene copolymer, ethylene/5-decyl-2-norbornene copolymer, ethylene/5-undecyl-2-norbornene copolymer, ethylene/5-dodecyl-2-norbornene copolymer, ethylene/5-phenyl-2-norbornene copolymer, ethylene/tetracyclododecene copolymer, ethylene/propylene/norbornene copolymer, ethylene/propylene/5-ethylidene-2-norbornene copolymer, ethylene/propylene/5-methyl-2-norbornene copolymer, ethylene/propylene/5-ethyl-2-norbornene copolymer, ethylene/propylene/5-propyl-2-norbornene copolymer, ethylene/propylene/5-butyl-2-norbornene copolymer, ethylene/propylene/5-pentyl-2-norbornene copolymer, ethylene/propylene/5-hexyl-2-norbornene copolymer, ethylene/propylene/5-heptyl-2-norbornene copolymer, ethylene/propylene/5-octyl-2-norbornene copolymer, ethylene/propylene/5-nonyl-2-norbornene copolymer, ethylene/propylene/5-decyl-2-norbornene copolymer, ethylene/propylene/5-undecyl-2-norbornene copolymer, ethylene/propylene/5-dodecyl-2-norbornene copolymer, ethylene/propylene/5-phenyl-2-norbornene copolymer, ethylene/propylene/tetracyclododecene copolymer, ethylene/1-butene/norbornene copolymer, ethylene/1-butene/5-ethylidene-2-norbornene copolymer, ethylene/1-butene/5-methyl-2-norbornene copolymer, ethylene/1-butene/5-ethyl-2-norbornene copolymer, ethylene/1-butene/5-propyl-2-norbornene copolymer, ethylene/1-butene/5-butyl-2-norbornene copolymer, ethylene/1-butene/5-pentyl-2-norbornene copolymer, ethylene/1-butene/5-hexyl-2-norbornene copolymer, ethylene/1-butene/5-heptyl-2-norbornene copolymer, ethylene/1-butene/5-octyl-2-norbornene copolymer, ethylene/1-butene/5-nonyl-2-norbornene copolymer, ethylene/1-butene/5-decyl-2-norbornene copolymer, ethylene/1-butene/5-undecyl-2-norbornene copolymer, ethylene/1-butene/5-dodecyl-2-norbornene copolymer, ethylene/1-butene/5-phenyl-2-norbornene copolymer, ethylene/1-butene/tetracyclododecene copolymer, ethylene/1-hexene/norbornene copolymer, ethylene/1-hexene/5-methyl-2-norbornene copolymer, ethylene/1-hexene/5-ethyl-2-norbornene copolymer, ethylene/1-hexene/5-propyl-2-norbornene copolymer, ethylene/1-hexene/5-butyl-2-norbornene copolymer, ethylene/1-hexene/5-pentyl-2-norbornene copolymer, ethylene/1-hexene/5-hexyl-2-norbornene copolymer, ethylene/1-hexene/5-heptyl-2-norbornene copolymer, ethylene/1-hexene/5-octyl-2-norbornene copolymer, ethylene/1-hexene/5-nonyl-2-norbornene copolymer, ethylene/1-hexene/5-decyl-2-norbornene copolymer, ethylene/1-hexene/5-undecyl-2-norbornene copolymer, ethylene/1-hexene/5-dodecyl-2-norbornene copolymer, ethylene/1-hexene/5-phenyl-2-norbornene copolymer, ethylene/1-hexene/tetracyclododecene copolymer, ethylene/1-octene/norbornene copolymer, ethylene/1-octene/5-methyl-2-norbornene copolymer, ethylene/1-octene/5-ethyl-2-norbornene copolymer, ethylene/1-octene/5-propyl-2-norbornene copolymer, ethylene/1-octene/5-butyl-2-norbornene copolymer, ethylene/1-octene/5-pentyl-2-norbornene copolymer, ethylene/1-octene/5-hexyl-2-norbornene copolymer, ethylene/1-octene/5-heptyl-2-norbornene copolymer, ethylene/1-octene/5-octyl-2-norbornene copolymer, ethylene/1-octene/5-nonyl-2-norbornene copolymer, ethylene/1- octene/5-decyl-2-norbornene copolymer, ethylene/1-octene/5-undecyl-2-norbornene copolymer, ethylene/1-octene/5-dodecyl-2-norbornene copolymer, ethylene/1-octene/5-phenyl-2-norbornene copolymer, ethylene/1-octene/tetracyclododecene copolymer, ethylene/1-decene/norbornene copolymer, ethylene/1-decene/5-methyl-2-norbornene copolymer, ethylene/1-decene/5-ethyl-2-norbornene copolymer, ethylene/1-decene/5-propyl-2-norbornene copolymer, ethylene/1-decene/5-butyl-2-norbornene copolymer, ethylene/1-decene/5-pentyl-2-norbornene copolymer, ethylene/1-decene/5-hexyl-2-norbornene copolymer, ethylene/1-decene/5-heptyl-2-norbornene copolymer, ethylene/1-decene/5-octyl-2-norbornene copolymer, ethylene/1-decene/5-nonyl-2-norbornene copolymer, ethylene/1-decene/5-decyl-2-norbornene copolymer, ethylene/1-decene/5-undecyl-2-norbornene copolymer, ethylene/1-decene/5-dodecyl-2-norbornene copolymer, ethylene/1-decene/5-phenyl-2-norbornene copolymer, ethylene/1-decene/tetracyclododecene copolymer, It is desired that the α-olefin/cycloolefin copolymer has an intrinsic viscosity [η], as measured in decaline at 135° C., of 0.05 to 10 dl/g, preferably 0.1 to 5 dl/g, and a glass transition temperature (Tg) of less than 10° C., preferably 0° C.

Next, the first cycloolefin copolymer composition according to the present invention is explained.

The first cycloolefin copolymer composition according to the present invention is formed from the above mentioned hydrocarbon elastomer component (A-1) and the cycloolefin random copolymer (B-1) obtained by copolymerization of the later described α-olefin (a) of at least two carbon atoms and cycloolefin (b) in the presence of the above mentioned hydrocarbon elastomer component (A-1).

Examples of the α-olefin (a) of at least two carbon atoms include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

Of these, preferred is ethylene or propylene.

The cycloolefin represented by the following formula [I] and/or the cycloolefin represented by the following formula [II] are used as the cycloolefin (b).

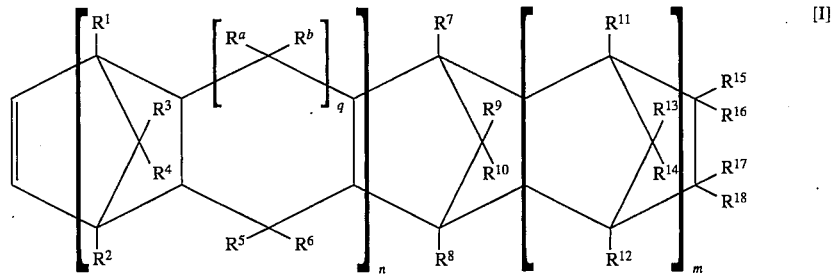

In the formula [I], n is 0 or 1, m is 0 or a positive integer, and q is 0 or 1. When q is 1, each $R^a$ and $R^b$ independently represents the following atom or hydrocarbon group, and when q is 0, both bonds may link together to form a 5-member ring.

$R^1$–$R^{18}$, $R^a$ and $R^b$ are each independently a hydrogen atom, a halogen atom or a hydrocarbon group.

Examples of the halogen atom include fluorine atom, chlorine atom, bromine atom and iodine atom.

Examples of the hydrocarbon group include alkyl group of 1–20 carbon atoms and cycloalkyl group of 3–15 carbon atoms.

Concrete examples of the alkyl group include methyl group, ethyl group, propyl group, isopropyl group, amyl group, hexyl group, octyl group, decyl group, dodecyl group and octadecyl group.

A concrete example of the cycloalkyl group is cyclohexyl group.

These groups may be substituted with a halogen atom.

Moreover, in the above formula [I], $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be linked together (or cooperate with each other) to form a monocyclic or polycyclic group, and thus formed monocyclic or polycyclic group may have double bond.

Examples of the monocyclic or polycyclic group are given below.

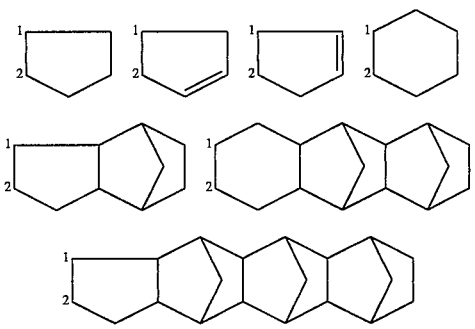

In the above-exemplified carbon atoms attached with numeral 1 or 2 are carbon atoms which form the alicyclic structure to which a group $R^{15}$ ($R^{16}$) or $R^{17}$ ($R^{18}$) is bonded as indicated in the formula [I].

Moreover, $R^{15}$ and $R^{16}$, or $R^{17}$ and $R^{18}$ may together form, an alkylidene group. This alkylidene group generally is alkylidene group of 2–20 carbon atoms, and examples of such alkylidene group include ethylidene group, propylidene group and isopropylidene group.

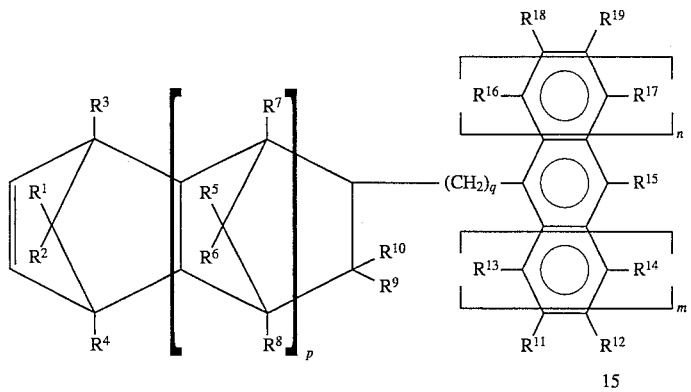

In the formula [II], each of p and q is independently 0 or an integer of 1 or more, and each of m and n is independently 0, 1 or 2.

Further, $R^1$–$R^{19}$ are each independently a hydrogen atom, a halogen atom, an aliphatic hydrocarbon group, an alicyclic hydrocarbon group, an aromatic hydrocarbon group or an alkoxy group.

In the formula [II], the halogen atom is the same halogen atom as explained in the above formula [I].

The aliphatic hydrocarbon groups include alkyl groups of 1–20 carbon atoms, such as methyl group, ethyl group, propyl group, isopropyl group, amyl group, hexyl group, octyl group, decyl group, dodecyl group and octadecyl group.

The alicyclic hydrocarbon groups include alicyclic hydrocarbon groups of 3–15 carbon atoms, such as cyclohexyl group.

The aromatic hydrocarbon groups include aryl group and aralkyl group such as phenyl group, tolyl group, naphtyl group, benzyl group and phenyl ethyl group. These groups may have lower alkyl groups.

The alkoxy groups include methoxy group, ethoxy group and propoxy group.

These groups may be substituted with a halogen atom.

A carbon atom to which $R^9$ and $R^{10}$ are linked may be bonded directly or by way of an alkylene group of 1–3 carbon atoms to a carbon atom to which $R^{13}$ is linked or a carbon atom to which $R^{11}$ is linked. That is, when the above-mentioned two carbon atoms are bonded to each other by way of an alkylene group, a group indicated by $R^9$ and a group indicated by $R^{13}$ or a group indicated by $R^{10}$ and a group indicated by $R^{11}$ cooperate with each other to form any alkylene group among methylene group (—$CH_2$—), ethylene group (—$CH_2CH_2$—) and propylene group (—$CH_2CH_2CH_2$—).

Furthermore, in the case of n=m=0, $R^{15}$ and $R^{12}$, or $R^{15}$ and $R^{19}$ may be linked together to form a monocyclic or polycyclic aromatic ring. Examples of the monocyclic or polycyclic aromatic ring include the following groups in which $R^{15}$ and $R^{12}$ together further form an aromatic ring in the case of n=m=0.

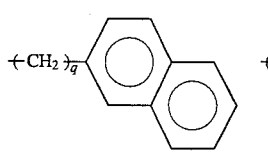
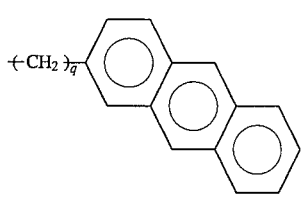

-continued

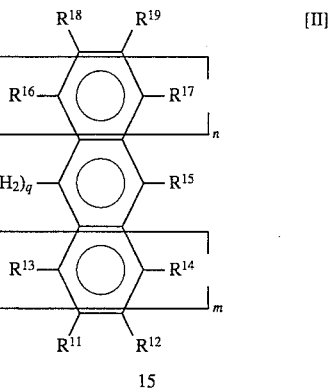

In the above formulas, q is the same as q in the formula [II].

Cycloolefins represented with Formula [I] or [II] include, for example, bicyclo[2.2.1]hept-2-ene derivatives, tricyclo[4.3.0.1$^{2,5}$]-3-decene derivatives, tricyclo[4.4.0.1$^{2,5}$]-3-undecene derivatives, tetracyclo[4.4.0.1$^{2,5}$.1$^{7,10}$]-3-dodecene derivatives, pentacyclo[6.6.1.1$^{3,6}$.0$^{2,7}$.0$^{9,14}$]-4-hexadecene derivatives, pentacyclo[6.5.1.1$^{3,6}$.0$^{2,7}$.0$^{9,13}$]-4-pentadecene derivatives, pentacyclo[7.4.0.1$^{2,5}$.1$^{9,12}$.0$^{8,13}$]-3-pentadecene derivatives, pentacyclopentadecadiene derivatives, pentacyclo[8.4.0.1$^{2,5}$.1$^{9,12}$.0$^{8,13}$]-3-hexadecene derivatives, hexacyclo[6.6.1.1$^{3,6}$.1$^{10,13}$.0$^{2,7}$.0$^{9,14}$]-4-heptadecene derivatives, heptacyclo[8.7.0.1$^{3,6}$.1$^{10,17}$.1$^{12,15}$.0$^{2,7}$.0$^{11,16}$]-4-eicosene derivatives, heptacyclo[8.7.0.1$^{2,9}$.1$^{4,7}$.1$^{11,17}$.0$^{3,8}$.0$^{12,16}$]-5-eicosene derivatives, heptacyclo [8.8.0.1$^{4,7}$.1$^{11,18}$.1$^{13,16}$.0$^{3,8}$.0$^{12,17}$]-5-heneicosene derivatives, octacyclo[8.0.1$^{2,9}$.1$^{4,7}$.1$^{11,18}$.1$^{13,16}$.0$^{3,8}$.0$^{12,17}$]-5-dococene derivatives, nonacyclo[10.9.1.1$^{4,7}$.1$^{13,20}$.1$^{15,18}$.0$^{3,8}$.0$^{2,10}$.0$^{12,21}$.0$^{14,19}$]-5-pentacocene derivatives, nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives, 1,4-methano-1,4,4a,9a-tetrahydrofluorene derivatives, 1,4-methano-1,4,4a,5,10,10a-hexahydroanthracene derivatives, cyclopentadiene-acenaphthylene adducts and the like.

Examples are as follows:

The bicyclo[2.2.1]hept-2-ene derivatives such as

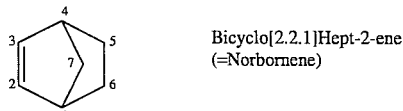

Bicyclo[2.2.1]Hept-2-ene (=Norbornene)

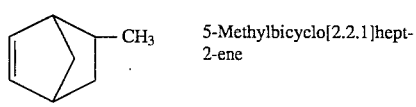

5-Methylbicyclo[2.2.1]hept-2-ene

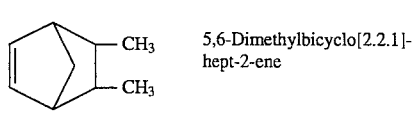

5,6-Dimethylbicyclo[2.2.1]-hept-2-ene

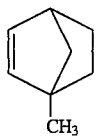 1-Methylbicyclo[2.2.1]hept-2-ene

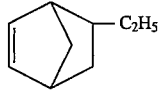 5-Ethylbicyclo[2.2.1]hept-2-ene

 5-n-Butylbicyclo[2.2.1]hept-2-ene

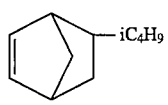 5-Isobutylbicyclo[2.2.1]hept-2-ene

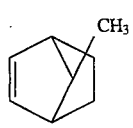 7-Methylbicyclo[2.2.1]hept-2-ene;

the tricyclo[4,3,0,1$^{2,5}$]-3-decene derivatives such as

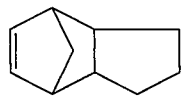 Tricyclo[4.3.0.1$^{2,5}$]-3-decene

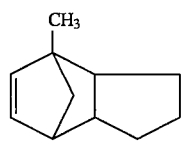 2-Methyltricyclo[4.3.0.1$^{2,5}$]-3-decene

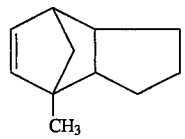 5-Methyltricyclo[4.3.0.1$^{2,5}$]-3-decene;

the tricyclo[4.4.0.1$^{2,5}$]-3-undecene derivatives such as

 Tricyclo[4.4.0.1$^{2,5}$]-3-undecene

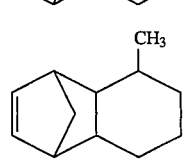 10-Methyltricyclo[4.4.0.1$^{2,5}$]-3-undecene;

the tetracyclo[4.4.0.1$^{2,5}$.1$^{7,10}$]-3-dodecene derivatives such as

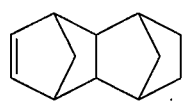 Tetracyclo[4.4.0.1$^{2,5}$.1$^{7,10}$]-3-dodecene

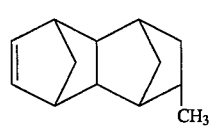 8-Methyltetracyclo[4.4.0.1$^{2,5}$.1$^{7,10}$]-3-dodecene

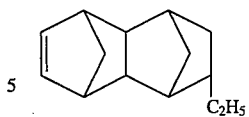 8-Ethyltetracyclo[4.4.0.1$^{2,5}$.1$^{7,10}$]-3-dodecene

 8-Propyltetracyclo[4.4.0.1$^{2,5}$.1$^{7,10}$]-3-dodecene

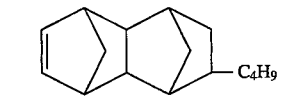 8-Butyltetracyclo[4.4.0.1$^{2,5}$.1$^{7,10}$]-3-dodecene

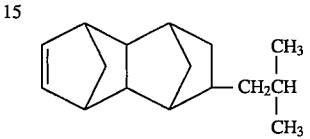 8-Isobutyltetracyclo-[4.4.0.1$^{2,5}$.1$^{7,10}$]-3-dodecene

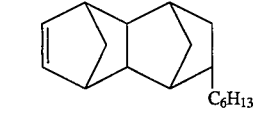 8-Hexyltetracyclo[4.4.0.1$^{2,5}$.1$^{7,10}$]-3-dodecene

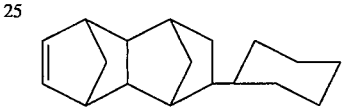 8-Cyclohexyltetracyclo[4.4.0.1$^{2,5}$.1$^{7,10}$]-3-dodecene

 8-Stearyltetracyclo[4.4.0.1$^{2,5}$.1$^{7,10}$]-3-dodecene

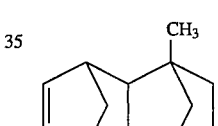 5,10-Dimethyltetracyclo-[4.4.0.1$^{2,5}$.1$^{7,10}$]-3-dodecene

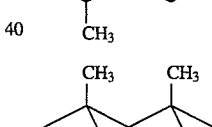 2,10-Dimethyltetracyclo-[4.4.0.1$^{2,5}$.1$^{7,10}$]-3-dodecene

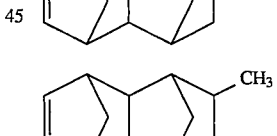 8,9-Dimethyltetracyclo-[4.4.0.1$^{2,5}$.1$^{7,10}$]-3-dodecene

 8-Ethyl-9-methyltetracyclo-[4.4.0.1$^{2,5}$.1$^{7,10}$]-3-dodecene

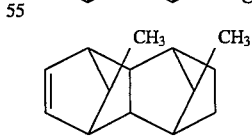 11,12-Dimethyltetracyclo-[4.4.0.1$^{2,5}$.1$^{7,10}$]-3-dodecene

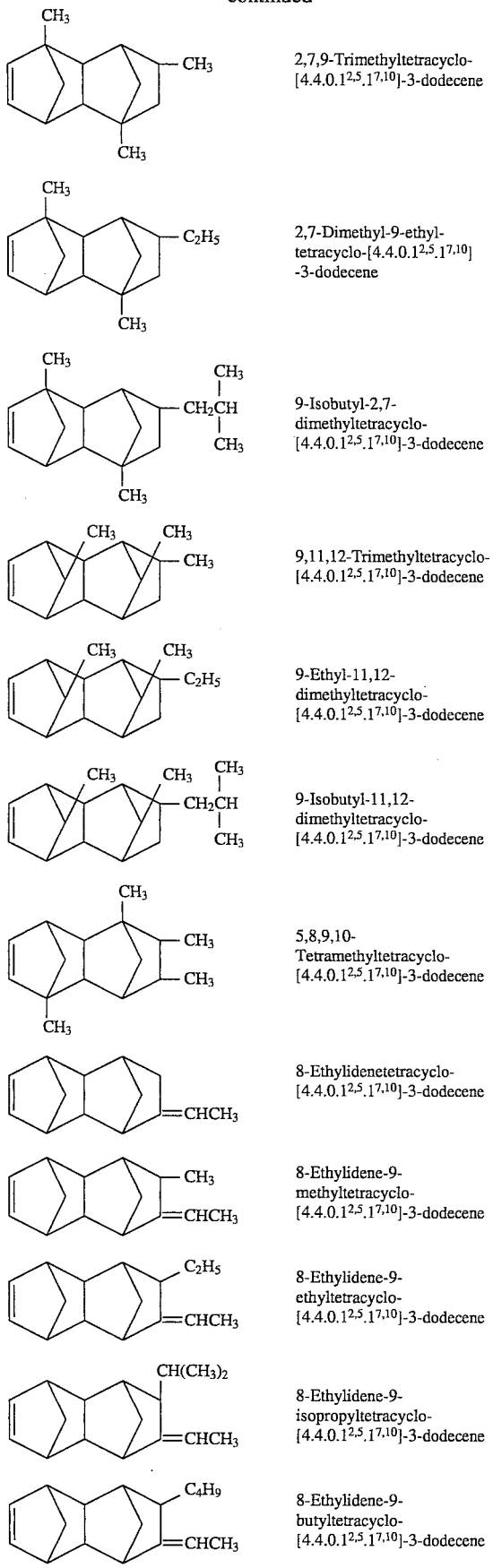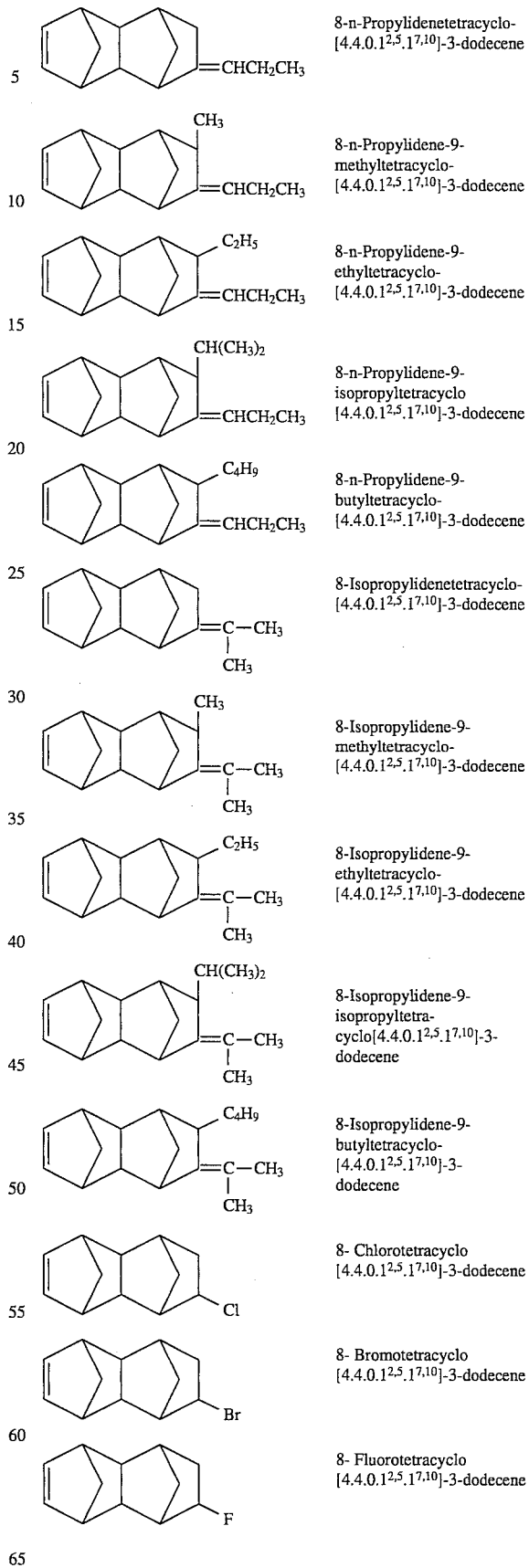

8,9-Dichlorotetracyclo-[4.4.0.1$^{2,5}$.1$^{7,10}$]-3dodecene;

the pentacyclo[6.5.1.1$^{3,6}$.0$^{2,7}$.0$^{9,13}$]-4-pentadecene derivatives such as Pentacyclo[6.5.1.1$^{3,6}$.0$^{2,7}$.0$^{9,13}$]-4-pentadecene 1,3-Dimethylpentacyclo-[6.5.1.1$^{3,6}$.0$^{2,7}$.0$^{9,13}$]-4-pentadecene 1,6-Dimethylpentacyclo-[6.5.1.1$^{3,6}$.0$^{2,7}$.0$^{9,13}$]-4-pentadecene 14,15-Dimethylpentacyclo-[6.5.1.1$^{3,6}$.0$^{2,7}$.0$^{9,13}$]-4-pentadecene;

the pentacyclo[7.4.0.1$^{2,5}$.1$^{9,12}$.0$^{8,13}$]-3-pentadecene derivatives such as Pentacyclo[7.4.0.1$^{2,5}$.1$^{9,12}$.0$^{8,13}$]-3-pentadecene Methyl-substituted pentacyclo[7.4.0.1$^{2,5}$.1$^{9,12}$.0$^{8,13}$]-3-pentadecene;

the pentacyclopentadecadiene compounds such as

Pentacyclo[6.5.1.1$^{3,6}$.0$^{2,7}$.0$^{9,13}$]-4,10-pentadecadiene;

the pentacyclo[8.4.0.1$^{2,5}$.1$^{9,12}$.0$^{8,13}$]-3-hexadecene derivatives such as Pentacyclo[8.4.0.1$^{2,5}$.1$^{9,12}$.0$^{8,13}$]-3-hexadecene 11-Methylpentacyclo[8.4.0.1$^{2,5}$.1$^{9,12}$.0$^{8,13}$]-3-hexadecene 11-Ethylpentacyclo[8.4.0.1$^{2,5}$.1$^{9,12}$.0$^{8,13}$]-3-hexadecene 10,11-Dimethylpentacyclo[8.4.0.1$^{2,5}$.1$^{9,12}$.0$^{8,13}$]-3-hexadecene;

the pentacyclo[6.6.1.1$^{3,6}$.0$^{2,7}$.0$^{9,14}$]-4-hexadecene derivatives such as Pentacyclo[6.6.1.1$^{3,6}$.0$^{2,7}$.0$^{9,14}$]-4-hexadecene 1,3-Dimethylpentacyclo-[6.6.1.1$^{3,6}$.0$^{2,7}$.0$^{9,14}$]-4-hexadecene 1,6-Dimethylpentacyclo-[6.6.1.1$^{3,6}$.0$^{2,7}$.0$^{9,14}$]-4-hexadecene 15,16-Dimethylpentacyclo-[6.6.1.1$^{3,6}$.0$^{2,7}$.0$^{9,14}$]-4-hexadecene;

the hexacyclo[6.6.1.1$^{3,6}$.1$^{10,13}$.0$^{2,7}$.0$^{9,14}$]-4-heptadecene derivatives such as Hexacyclo[6.6.1.1$^{3,6}$.1$^{10,13}$.0$^{2,7}$.0$^{9,14}$]-heptadecene 12-Methylhexacyclo[6.6.1.1$^{3,6}$.1$^{10,13}$.0$^{2,7}$.0$^{9,14}$]-4-heptadecene 12-Ethylhexacyclo[6.6.1.1$^{3,6}$.1$^{10,13}$.0$^{2,7}$.0$^{9,14}$]-4-heptadecene 12-Isobutylhexacyclo[6.6.1.1$^{3,6}$.1$^{10,13}$.0$^{2,7}$.0$^{9,14}$]-4-heptadecene 1,6,10-Trimethyl-12-isobutylhexacyclo[6.6.1.1$^{3,6}$.1$^{10,13}$.0$^{2,7}$.0$^{9,14}$]-4-heptadecene;

the heptacyclo-5-eicosene derivatives such as

Heptacyclo[8.7.0.1$^{2,9}$.1$^{4,7}$.1$^{11,17}$.0$^{3,8}$.0$^{12,16}$]-5-eicosene;

the heptacyclo[8.7.0.1$^{3,6}$.1$^{10,17}$.1$^{12,15}$.0$^{2,7}$.0$^{11,16}$]-4-eicosene derivatives such as

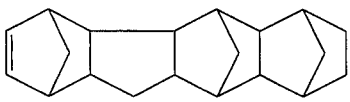

Heptacyclo[8.7.0.1$^{3,6}$.1$^{10,17}$.1$^{12,15}$.0$^{2,7}$.0$^{11,16}$]-4-eicosene

Dimethyl-substituted heptacyclo-[8.7.0.1$^{3,6}$.1$^{10,17}$.1$^{12,15}$.0$^{2,7}$.0$^{11,16}$]-4-eicosene;

the heptacyclo-5-heneicosene derivatives such as

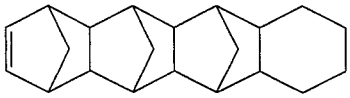

Heptacyclo[8.8.0.1$^{2,9}$.1$^{4,7}$.1$^{11,18}$.0$^{3,8}$.0$^{12,17}$]-5-heneicosene

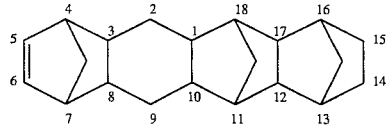

Heptacyclo[8.8.0.1$^{4,7}$.1$^{11,18}$.1$^{13,16}$.0$^{3,8}$.0$^{12,17}$]-5-heneicosene

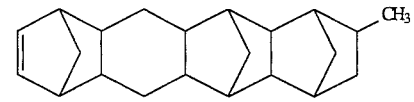

15-Methyl-heptacyclo[8.8.0.1$^{4,7}$.1$^{11,18}$.1$^{13,16}$.0$^{3,8}$.0$^{12,17}$]-5-heneicosene Trimethyl-substituted-heptacyclo[8.8.0.1$^{4,7}$.1$^{11,18}$.1$^{13,16}$.0$^{3,8}$.0$^{12,17}$]-5-heneicosene;

the octacyclo[8.8.0.1$^{2,9}$.1$^{4,7}$.1$^{11,18}$.1$^{13,16}$.0$^{3,8}$.0$^{12,17}$]-5-docosene derivatives such as Octacyclo[8.8.0.1$^{2,9}$.1$^{4,7}$.1$^{11,18}$.1$^{13,16}$.0$^{3,8}$.0$^{12,17}$]-5-docosene 15-Methyloctacyclo[8.8.0.1$^{2,9}$.1$^{4,7}$.1$^{11,18}$.1$^{13,16}$.0$^{3,8}$.0$^{12,17}$]-5-docosene 15-Ethyloctacyclo[8.8.0.1$^{2,9}$.1$^{4,7}$.1$^{11,18}$.1$^{13,16}$.0$^{3,8}$.0$^{12,17}$]-5-docosene;

the nonacyclo-[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as

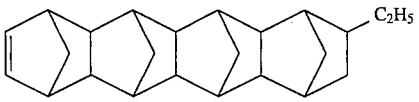

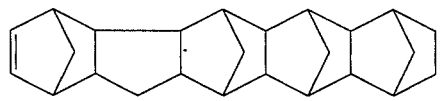

Nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene

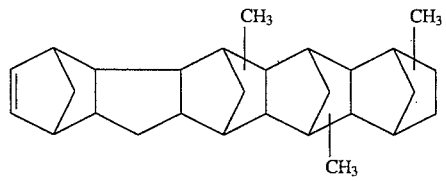

Trimethyl-substituted-nonacyclo-[10.9.1.1$^{4,7}$.1$^{13,20}$.1$^{15,18}$.0$^{2,10}$.0$^{3,8}$.0$^{12,21}$.0$^{14,19}$]-5-pentacosene The nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as

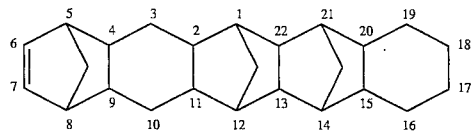

Nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene and furthermore,

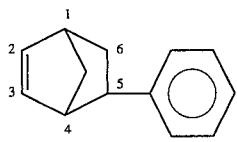 5-Phenyl-bicyclo[2.2.1]hept-2-ene
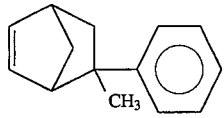 5-Methyl-5-phenyl-bicyclo[2.2.1]hept-2-ene
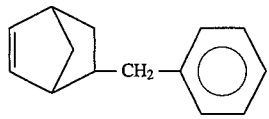 5-Benzyl-bicyclo[2.2.1]hept-2-ene
 5-Tolyl-bicyclo[2.2.1]hept-2-ene
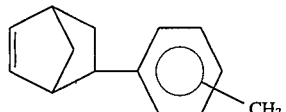 5-(Ethylphenyl)-bicyclo[2.2.1]hept-2-ene
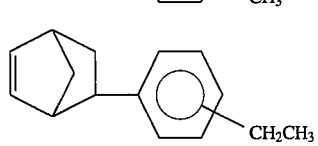 5-(Isopropylphenyl)-bicyclo[2.2.1]hept-2-ene
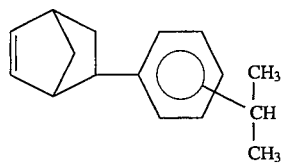 5-(Biphenyl)-bicyclo[2.2.1]hept-2-ene
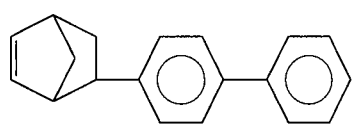 5-(β-Naphthyl)-bicyclo[2.2.1]hept-2-ene
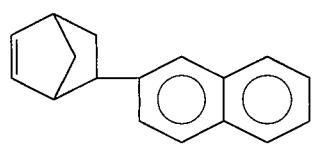 5-(α-Naphthyl)-bicyclo[2.2.1]hept-2-ene
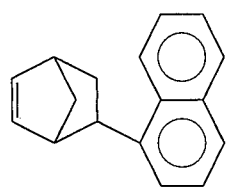 5-(Anthracenyl)-bicyclo[2.2.1]hept-2-ene
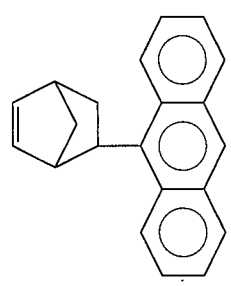

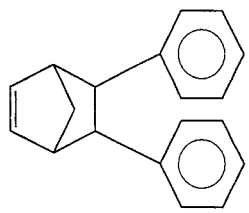

5,6-Diphenyl-bicyclo[2.2.1]hept-2-ene

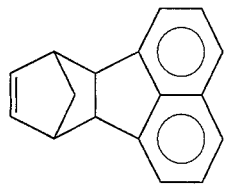

Cyclopentadiene-acenaphthylene adducts

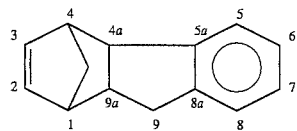

1,4-Methano-1,4,4a,9a-tetrahydro-fluorene

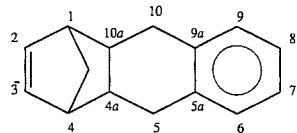

1,4-Methano-1,4,4a,5,10,10a-hexahydroanthracene

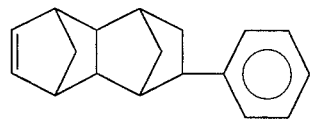

8-Phenyltetracyclo[4.4.0.1$^{2,5}$.1$^{7,10}$]-3-dodecene

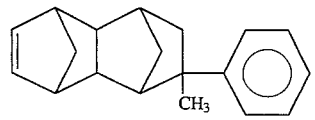

8-Methyl-8-phenyl-tetracyclo[4.4.0.1$^{2,5}$.1$^{7,10}$]-3-dodecene

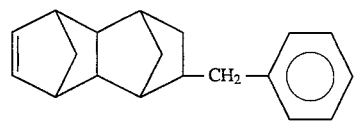

8-Benzyl-tetracyclo[4.4.0.1$^{2,5}$.1$^{7,10}$]-3-dodecene

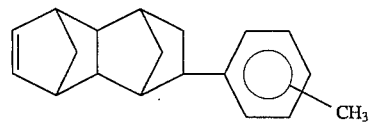

8-Tolyl-tetracyclo[4.4.0.1$^{2,5}$.1$^{7,10}$]-3-dodecene

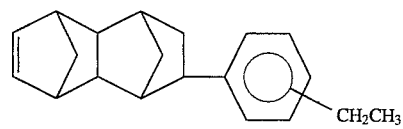

8-(Ethylphenyl)-tetracyclo[4.4.0.1$^{2,5}$.1$^{7,10}$]-3-dodecene

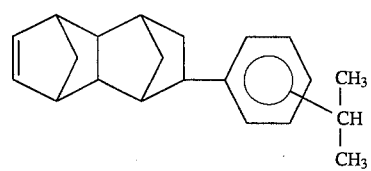

8-(Isopropylphenyl)tetracyclo[4.4.0.1$^{2,5}$.1$^{7,10}$]-3-dodecene

-continued

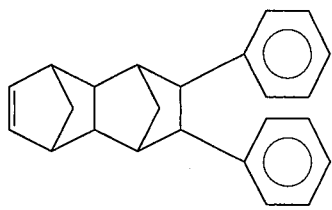
8,9-Diphenyl-tetracyclo[4.4.0.1$^{2,5}$.1$^{7,10}$]-3-dodecene

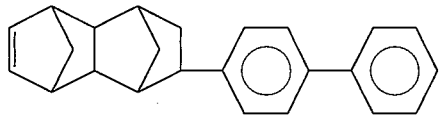
8-(Biphenyl)-tetracyclo[4.4.0.1$^{2,5}$.1$^{7,10}$]-3-dodecene

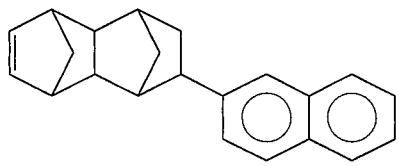
8-(β-Naphthyl)-tetracyclo[4.4.0.1$^{2,5}$.1$^{7,10}$]-3-dodecene

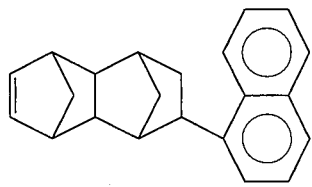
8-(α-Naphthyl)-tetracyclo[4.4.0.1$^{2,5}$.1$^{7,10}$]-3-dodecene

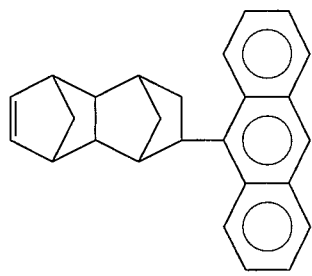
8-(Anthracenyl)-tetracyclo[4.4.0.1$^{2,5}$.1$^{7,10}$]-3-dodecene

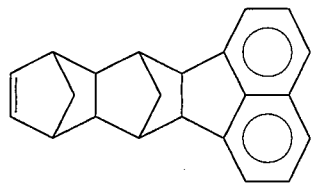
Compound of cyclopentadiene-acenaphthylene adducts with cyclopentadiene further added

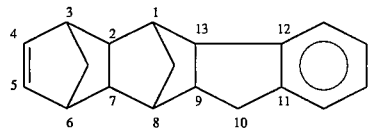
11,12-Benzo-pentacyclo[6.5.1.1$^{3,6}$.0$^{2,7}$.0$^{9,13}$]-4-pentadecene

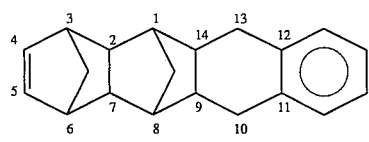
11,12-Benzo-pentacyclo[6.6.1.1$^{3,6}$.0$^{2,7}$.0$^{9,14}$]-4-hexadecene

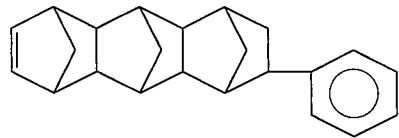
11-Phenyl-hexacyclo[6.6.1.1$^{3,6}$.1$^{10,13}$.0$^{2,7}$.0$^{9,14}$]-4-heptadecene

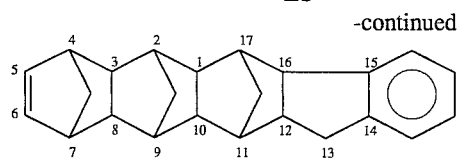

14,15-Benzo-heptacyclo
[8.7.0.1$^{2,9}$.1$^{4,7}$.1$^{11,17}$.0$^{3,8}$.
0$^{12,16}$]-5-eicosene The cycloolefins (b) represented by the above formula [I] or [II] can be prepared by Diels-Alder reaction of cyclopentadiene with the corresponding olefins.

These cycloolefins (b) may be used singly or in combination of two or more kinds.

Cycloolefin copolymer composition

The first cycloolefin copolymer compositions of the present invention are compositions of an addition polymer obtained by polymerization of a cycloolefin represented by the aforementioned formula [I] and/or a cycloolefin (b) represented by the aforementioned formula [II] with an α-olefin (a) of at least 2 carbon atoms in the presence of a hydrocarbon elastomer (A-1) substantially free from a polymerizable double bond. That is, the first cycloolefin copolymer compositions of the invention are resin compositions comprising a hydrocarbon elastomer (A-1) component and a cycloolefin random copolymer (B-1) component comprising an α-olefin (a) unit of at least 2 carbon atoms and a cycloolefin (b) component.

This cycloolefin copolymer composition contains the above-mentioned hydrocarbon elastomer (A-1) component in an amount of 1–50% by weight, preferably 3–40% by weight. The hydrocarbon elastomer (A-1) of the composition is finely dispersed in the cycloolefin random copolymer (B-1) formed from the α-olefin (a) and the cycloolefin (b), because such cycloolefin copolymer composition as mentioned above is prepared by copolymerization of an α-olefin (a) of at least 2 carbon atoms and a cycloolefin (b) in the presence of the hydrocarbon elastomer (A-1). This matter is also shown by the fact that the above-mentioned cycloolefin copolymer composition is superior in impact resistance to a cycloolefin copolymer composition obtained by simply melt-blending a cycloolefin random copolymer obtained by copolymerization of the α-olefin of at least 2 carbon atoms and the cycloolefin (b) with a hydrocarbon elastomer substantially free from a polymerizable double bond.

In the first cycloolefin copolymer composition of the invention, the cycloolefin random copolymer (B-1) may be a copolymer obtained by addition polymerization, in addition to the α-olefin (a) of at least 2 carbon atoms and the cycloolefin (b), of cycloolefin (other cycloolefin) other than the cycloolefin represented by the aforementioned formula [I] or [II], said other cycloolefin being used in such an amount that no properties of the resulting composition are marred.

By "other cycloolefin" as used herein is meant a wide concept 'cycloolefin' including unsaturated polycyclic hydrocarbon compounds except for the cycloolefins represented by the formulas [I] or [II].

More particularly, examples of the other cycloolefin may include cyclobutene, cyclopentene, cyclohexene, 3,4-dimethylcyclopentene, 3-methylcyclohexene, 2-(2-methylbutyl)-1-cyclohexene, styrene, α-methylstyrene and 3a,5,6,7a-tetrahydro-4,7-metano-1H-indene.

The first cycloolefin copolymer compositions of the invention may be prepared by carrying out the copolymerization of (a) an α-olefin of at least 2 carbon atoms and (b) a cycloolefin represented by the aforementioned formula [I] or [II] in a liquid phase, preferably in a hydrocarbon solvent in the presence of the aforementioned hydrocarbon elastomer (A-1) in such a manner that the resulting copolymer composition may contain therein the aforesaid hydrocarbon elastomer (A-1) component in an amount of 1–50% by weight.

In carrying out such copolymerization reaction, there is used a transition metal type catalyst, including concretely (i) catalysts formed from a soluble vanadium compound and an organoaluminum compound (1), or (ii) catalyst formed from a metallocene compound of a transition metal selected from the IV B group of the periodic table or lanthanide series and an organoaluminum oxy compound and, if necessary, organoaluminum compound (2).

The soluble vanadium compounds forming the catalyst (i) include, in concrete, such compounds represented by the following formulas.

VO(OR)$_a$V$_b$ or V(OR)$_c$X$_d$

In these formulas, R is a hydrocarbon group, and a, b, c and d satisfy relations of $0 \leq a \leq 3$, $0 \leq b \leq 3$, $2 \leq a+b \leq 3$, $0 \leq c \leq 4$, $0 \leq d \leq 4$, and $3 \leq c+d \leq 4$.

Examples of the soluble vanadium compounds include

VOCl$_3$,

VO(OC$_2$H$_5$)Cl$_2$,

VO(OC$_2$H$_5$)$_2$Cl,

VO(O—iso—C$_3$H$_7$)Cl$_2$,

VO(O—n—C$_4$H$_9$)Cl$_2$,

VO(OC$_2$H$_5$)$_3$, VOBr$_2$, VCl$_4$, VOCl$_2$,

VO(O—n—C$_4$H$_9$)$_3$ and

VOCl$_3$·2(OC$_8$H$_{17}$OH).

These compounds can be used singly or in combination of two or more kinds.

The above mentioned soluble vanadium compound can be used in the form of an electron donor addition product thereof obtained by bringing such electron donors as mentioned below into contact with the above-mentioned soluble vanadium compounds.

Such electron donors include, for example, hydrogen containing electron donors, such as alcohols, phenols, ketones, aldehydes, carboxylic acids, organic acid halides, esters of organic or inorganic acids, ethers, diethers, acid amides, acid anhydrides, alkoxysilanes and the like, and nitrogen containing electron donors, such as ammonias, amines, nitriles, pyridines, isocyanates and the like;

more concretly, alcohols having from 1 to 18 carbon atoms, such as methanol, ethanol, propanol, butanol, pentanol, hexanol, 2-ethylhexanol, octanol, dodecanol, octadecyl alcohol, oleyl alcohol, bnenzyl alcohol, phenylethyl alcohol, cumyl alcohol, isopropyl alcohol, isopropylbenzyl alcohol and the like, halogen containing alcohols having from 1 to 18 carbon atoms, such as trichloromethanol, trichloroethanol, trichlorohexanol and the like, phenols which have from 6 to 20 carbon atoms and may have a lower alkyl group, such as phenol, cresol, xylenol, ethylphenol, propylphenol, nonyl phenol, cumyl phenol, naphthol and the like, ketones having from 3 to 15 carbon atoms, such as acetone, methylethyl ketone, methylisobutyl ketone, acetophenone, benzophenone, benzoquinone and the like, aldehydes having from 2 to 15 carbon atoms, such as acetaldehyde, propionaldehyde, octylaldehyde, benzaldehyde, tolualdehyde, naphthaldehyde and the like, organic acid esters having from 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarbonate, methyl benzoate, ethyl benzoate, propyl benzoate, butyl benzoate, octyl benzoate, cyclohexyl benzoate, phenyl benzoate, benzyl benzoate, methy toluylate, ethyl toluylate, amyl toluylate, ethyl ethylbenzoate, methyl anisate, ethyl anisate, ethoxy ethylbenzate, γ-butyrolactone, δ-valerolactone, cumarin, phthalide, ethyl carbonate and the like, acid halides having from 2 to 15 carbon atoms, such as acetyl chloride, benzoyl chloride, toluic acid chloride, anisic acid chloride and the like, ethers having from 2 to 20 carbon atoms, such as methyl ether, ethyl ether, isopropyl ether, butyl ether, amyl ether, tetrahydrofuran, anisole, diphenyl ether and the like, acid anhydrides, such as acetic anhydride, phthalic anhydride, benzoic anhydride and the like, alkoxysilanes, such as ethyl silicate, diphenyldimethoxysilane and the like, acid amides, such as acetic N,N-dimethylamide, benzoic acid N,N-diethylamide, toluic acid N,N-dimethylamide and the like, amines, such as trimethylamine, triethylamine, tributylamine, tribenzylamine, tetramethylethylenediamine and the like, nitriles, such as acetonitrile, benzonitrile, trinitrile and the like, and pyridines, such as pyridine, methylpyridine, ethylpyridine, dimethylpyridine and the like.

In the preparation of the electron donor addition product of the soluble vanadium compound, the above-exemplified electron donors may be used singly or in combination of two or more kinds.

The organoaluminum compound (1) employable for the catalyst (i), which is used with the soluble vanadium compound, includes a compound containing at least one Al—C bond in the molecule. Examples of the organoaluminum compounds include the compounds represented by the following formulas (a) and (b).

$$R^1_m Al(OR^2)_n H_p X_q \tag{a}$$

wherein each of $R^1$ and $R^2$ is a hydrocarbon group having usually 1–15 carbon atoms, preferably 1–4 carbon atoms, and they may be the same or different from each other; X is a halogen atom; m, n, p and q are numbers satisfying the conditions of $0 \leq m \leq 3$, $0 \leq n \leq 3$, $0 \leq p < 3$, $0 \leq q < 3$, and $m+n+p+q=3$.

An alkyl complex compound of aluminum and a metal in Group I of the periodic table, which is represented by the formula;

$$M^1 Al R^1_4 \tag{b}$$

wherein $M^1$ is Li, Na or K; and $R^1$ has the same meaning as defined in the above formula (a).

Concrete examples of the organoaluminum compounds represented by the above formula (a) include the compounds exemplified as follows:

$$R^1_m Al(OR^2)_{3-m} \tag{1}$$

wherein $R^1$ and $R^2$ have the same meanings as defined in the above formula (a), and m is preferably a number of $1.5 \leq m < 3$;

$$R^1_m Al X_{3-m} \tag{2}$$

wherein $R^1$ has the same meaning as defined in the above formula (a), X is halogen, and m is preferably a number of $0 < m < 3$;

$$R^1_m Al H_{3-m} \tag{3}$$

wherein $R^1$ has the same meaning as defined in the above formula (a), and m is preferably a number of $2 \leq m < 3$; and

$$R^1_m Al(OR^2)_n X_q \tag{4}$$

wherein $R^1$ and $R^2$ have the same meanings as defined in the above formula (a), X is halogen, and m, n and q are numbers satisfying the conditions of $0 < m \leq 3$, $0 \leq n < 3$, $0 \leq q < 3$, and $m+n+q=3$.

The organoaluminum compounds represented by the formula (a) include, in concrete, such compounds exemplified as follows.

Concrete examples of the organoaluminum compounds represented by the above formula (a) are as follows;

trialkylaluminum such as triethylaluminum and tributylaluminum;

trialkenylaluminum such as triisopropenylaluminum;

dialkylaluminum alkoxide such as diethylaluminum ethoxide and dibutylaluminum butoxide; and ethylaluminum sesquiethoxide, butylaluminum sesquibutoxide and partially alkoxylated alkylaluminum having an average composition, which is represented for example by the formula $R^1_{2.5} Al(OR^2)_{0.5}$.

Concrete examples of the organoaluminum compounds represented by the above formula (2) are as follows;

dialkylaluminum halide such as diethylaluminum chloride, dibutylaluminum chloride and diethylaluminum bromide;

alkylaluminum sesquihalide such as ethylaluminum sesquichloride, butylaluminum sesquichloride and ethylaluminum sesquibromide; and partially halogenated alkylaluminum such as ethylaluminum dichloride, propylaluminum dichloride and butylaluminum dibromide.

Concrete examples of the organoaluminum compounds represented by the above formula (3) are as follows;

dialkylaluminum hydride such as diethylaluminum hydride and dibutylaluminum hydride; and partially hydrogenated alkylaluminum such as ethylaluminum dihydride and propylaluminum dihydride.

Concrete examples of the organoaluminum compounds represented by the above formula (4) are as follows;

partially alkoxylated and halogenated alkylaluminum such as ethylaluminum ethoxychloride, butylaluminum butoxychloride and ethylaluminum ethoxybromide.

The organoaluminum compound may be a compound similar to the compound represented by the formula (a), such as an organoaluminum compound in which two or more aluminums are linked through oxygen atom or nitrogen atom. Examples of such compounds include the followings.

$(C_2H_5)_2AlOAl(C_2H_5)_2$, $(C_4H_9)_2AlOAl(C_4H_9)_2$ and $$\begin{array}{c}(C_2H_5)_2AlNAl(C_2H_5)_2\\|\\C_6H_5\end{array}$$

Further, the compounds belonging to the above mentioned formula (b) include $LiAl(C_2H_5)_4$ and $LiAl(C_7H_{15})_4$.

Among the above-exemplified organoaluminum compounds, preferably used are alkylaluminum halide, alkylaluminum dihalide and mixtures thereof.

Next, the catalyst (ii) formed from metallocene compound of a transition metal selected from Group IVB of the periodic table or lanthanide series, an organoaluminum oxy-compound, and if neccessary, an organoaluminum compound (2), which is used in the present invention is explained.

The metallocene compound of the transition metal selected from Group IVB of the periodic table and lanthanide series include the compounds represented by the following formula [a].

$$ML_x \qquad [a]$$

In the above formula [a], M is a transition metal selected from Group IVB of the periodic table and lanthanide series, and concrete examples of M include zirconium, titanium, hafnium, neodymium, samarium and ytterbium. L is a ligand coordinating to the transition metal, and at least one of ligand L is a ligand having a cyclopentadienyl skeleton.

Ligand L other than the ligand having a cyclopentadienyl skeleton is a hydrocarbon group of 1–12 carbon atoms, an alkoxy group, an aryloxy group, a halogen atom, a trialkylsilyl group, $SO_3R$ group (provided that R is a hydrocarbon group of 1 to 8 of carbon atoms which may have such a substituent as halogen) or a hydrogen atom, and x is a valence of the transition metal atom.

The ligands L having a cyclopentadienyl skeleton are, for example, cyclopentadienyl group, alkyl- or cycloalkyl-substituted cyclopentadienyl groups such as methylcyclopentadienyl group, ethylcyclopentadienyl group, propylcyclopentadienyl group, butylcyclopentadienyl group, hexylcyclopentadienyl group, octylcyclopentadienyl group, dimethylcyclopentadienyl group, trimethylcyclopentadienyl group, tetramethylcyclopentadienyl group, pentamethylcyclopentadienyl group, methylethylcyclopentadienyl group, methylpropylcyclopentadienyl group, methylbutylcyclopentadienyl group, methylhexylcyclopentadienyl group, methylbenzylcyclopentadienyl group, ethylbutylcyclopentadienyl group, ethylhexylcyclopentadienyl group, and methylcyclohexylcyclopentadienyl group; or indenyl group, 4,5,6,7-tetrahydroindenyl group and fluorenyl group.

These groups as exemplified above may be substituted with a halogen atom or a trialkylsilyl group.

The ligands L other than those having a cyclopentadienyl skeleton may include the hydrocarbon group of 1–12 carbon atoms, alkoxy group, aryloxy group, sulfonic acid containing group ($—SO_3R^a$: wherein $R^a$ is alkyl group, alkyl group substituted with halogen atom, aryl group or aryl group substituted with halogen atom or alkyl group), halogen atom or hydrogen atom.

The hydrocarbon group of 1–12 carbon atoms includes such group as alkyl group, cycloalkyl group, aryl group or aralkyl group, and more particularly, the alkyl group includes methyl group, ethyl group, n-propyl group, isopropyl group, n-butyl group, isobutyl group, sec-butyl group, t-butyl group, pentyl group, hexyl group, octyl group, decyl group and dodecyl group;

the cycloalkyl group includes cyclopentyl group and cyclohexyl group;

the aryl group includes phenyl group and tolyl group; and the aralkyl group includes benzyl group and neophyl group.

Further, the alkoxy group includes methoxy group, ethoxy group, n-propoxy group, isopropoxy group, n-butoxy group, isobutoxy group, sec-butoxy group, t-butoxy group, pentoxy group, hexoxy group and octoxy group;

aryloxy group includes phenoxy group;

sulfonic acid containing group ($—SO_3R^a$) includes methanesulfonate group, p-toluenesulfonate group, trifluoromethanesulfonate group and p-chlorobenzenesulfonate group; and the halogen atom includes fluorine, chlorine, bromine and iodine.

When the valence of the transition metal atom is, for example, 4, the transition metal compound represented by the above formula [a] is represented by the following formula [a'] in more detail.

$$R^1_a R^2_b R^3_c R^4_d M \qquad [a']$$

wherein M represents zirconium, titanium, hafnium, neodymium, samarium or ytterbium, $R^1$ represents a group having a cyclopentadienyl skeleton, $R^2$, $R^3$ and $R^4$ each represent a group having a cyclopentadienyl skeleton, alkyl group, cycloalkyl group, aryl group, aralkyl group, alkoxy group, aryloxy group, halogen atom, trialkylsilyl group, $SO_3R$ group or hydrogen atom, a is an integer of 1 or more, and a+b+c+d=4.

In the present invention, there is used preferably a transition metal compound having the above-mentioned formula [a'] in which at least one of $R^2$, $R^3$ and $R^4$ is the group having a cyclopentadienyl skeleton, for example, $R^1$ and $R^2$ are the groups having a cyclopentadienyl skeleton. The groups having a cyclopentadienyl skeleton mentioned above may be linked together through an alkylene group such as ethylene or propylene, an alkylidene group such as isopropylidene, a substituted alkylene group such as diphenylmethylene, a silylene group or a substituted silylene group such as dimethylsilylene, diphenylsilylene or methylphenylsilylene. Further, $R^3$ and $R^4$ are each a group having a cyclopentadienyl skeleton, alkyl group, cycloalkyl group, aryl group, aralkyl group, alkoxy group, aryloxy group, halogen atom, trialkylsilyl group, $SO_3R$ group or hydrogen atom.

Exemplified below are metallocene compounds of the transition metal wherein M is zirconium.

Bis(cyclopentadienyl)zirconium monochloride monohydride,

Bis(cyclopentadienyl)zirconium dichloride,

Bis(cyclopentadienyl)zirconium dibromide,

Bis(cyclopentadienyl)methylzirconium monochloride,

Bis(cyclopentadienyl)ethylzirconium monochloride,

Bis(cyclopentadienyl)cyclohexylzirconium monochloride,

Bis(cyclopentadienyl)phenylzirconium monochloride,

Bis(cyclopentadienyl)benzylzirconium monochloride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium phenoxymonochloride,
Bis(methylcyclopentadienyl)zirconium dichloride,
Bis(ethylcyclopentadienyl)zirconium dichloride,
Bis(propylcyclopentadienyl)zirconium dichloride,
Bis(butylcyclopentadienyl)zirconium dichloride,
Bis(hexylcyclopentadienyl)zirconium dichloride,
Bis(octylcyclopentadienyl)zirconium dichloride,
Bis(indenyl)zirconium dichloride,
Bis(indenyl)zirconium bis(p-toluenesulfonate),
Bis(4,5,6,7-tetrahydroindenyl)zirconium dichloride,
Bis(indenyl)zirconium dibromide,
Bis(cyclopentadienyl)zirconium dimethyl,
Bis(cyclopentadienyl)zirconium methoxychloride,
Bis(cyclopentadienyl)zirconium ethoxychloride,
Bis(fluorenyl)zirconium dichloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium bis(trifluoromethanesulfonate),
Bis(dimethylcyclopentadienyl)dimethylzirconium,
Bis(methylbutylcyclopentadienyl)zirconium bis(methanesulfonate),
Bis(ethylcyclopentadienyl)zirconium bis(trifluoromethanesulfonate),
Bis(propylcyclopentadienyl)zirconium bis(trifluoromethanesulfonate),
Bis(butylcyclopentadienyl)zirconium bis(trifluoromethanesulfonate),
Bis(hexylcyclopentadienyl)zirconium bis(trifluoromethanesulfonate),
Bis(dimethylcyclopentadienyl)zirconium bis(trifluoromethanesulfonate),
Bis(methylethylcyclopentadienyl)zirconium bis(trifluoromethanesulfonate),
Bis(methylpropylcyclopentadienyl)zirconium bis(trifluoromethanesulfonate),
Bis(methylbutylcyclopentadienyl)zirconium bis(trifluoromethanesulfonate),
Bis(dimethylcyclopentadienyl)zirconium dichloride,
Bis(dimethylcyclopentadienyl)zirconium ethoxychloride,
Bis(methylethylcyclopentadienyl)zirconium dichloride,
Bis(methylpropylcyclopentadienyl)zirconium dichloride,
Bis(methylbutylcyclopentadienyl)zirconium dichloride,
Bis(methylhexylcyclopentadienyl)zirconium dichloride,
Bis(methyloctylcyclopentadienyl)zirconium dichloride,
Bis(ethylbutylcyclopentadienyl)zirconium dichloride,
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(methylbenzylcyclopentadienyl)zirconium dichloride,
Bis(ethylhexylcyclopentadienyl)zirconium dichloride,
Bis(methylcyclohexylcyclopentadienyl)zirconium dichloride,
Ethylenebis(indenyl)dimethylzirconium,
Ethylenebis(indenyl)zirconium dichloride,
Ethylenebis(indenyl)diphenylzirconium,
Ethylenebis(indenyl)methylzirconium monochloride,
Ethylenebis(indenyl)zirconium bis(trifluoromethanesulfonate),
Ethylenebis(indenyl)zirconium bis(methanesulfonate),
Ethylenebis(indenyl)zirconium bis(p-toluenesulfonate),
Ethylenebis(indenyl)zirconlure bis(p-chlorobenzenesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Isopropylidene(cyclopentadienyl-fluorenyl)dimethyl zirconium,
Isopropylidene(cyclopentadienyl-indenyl)zirconium dichloride,
Isopropylidene(methylcyclopentadienyl-fluorenyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl) zirconium dichloride,
Dimethylsilylenebis (indenyl) zirconium dichloride,
Dimethylsilylenebis (indenyl) zirconlure bis (trifluoromethanesulfonate),
Dimethylsilylenebis(4,5,6,7-tetrahydroindenyl) zirconium dichloride,
Dimethylsilylene(cyclopentadienyl-fluorenyl)zirconium dichloride,
Diphenylsilylenebis(indenyl)zirconium dichloride, and
Methylphenylsilylenebis(indenyl)zirconium dichloride.
Of these, preferably used are the following compounds.
Bis(indenyl)zirconlure dichloride,
Bis(indenyl)zirconlure dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis (4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Isopropylidene(cyclopentadienyl-fluorenyl)dimethyl zirconium,
Isopropylidene(cyclopentadienyl-indenyl)zirconium dichloride,
Isopropylidene(methylcyclopentadienyl-fluorenyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl) zirconium dichloride, Dimethylsilylenebis(indenyl)zirconium dichloride,
Dimethylsilylenebis(indenyl) zirconlure bis (trifluoromethanesulfonate),
Dimethylsilylenebis(4,5,6,7-tetrahydroindenyl) zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(trimethylsilylcyclopentadienyl)zirconium dichloride.

In the transition metal compounds exemplified above, the di-substituted cyclopentadienyl ring includes 1,2- and 1,3-substituted compounds, and the tri-substituted cyclopentadienyl ring includes 1,2,3- and 1,2,4-substituted compounds. Further, the alkyl group such as propyl or butyl includes isomer such as n-, i-, sec-, tert-compounds, In the present invention, the above-exemplified zirconium compounds in which the zirconium metal has been replaced by titanium metal, hafnium metal, neodymium metal, samarium metal or ytterbium metal can also be used as the transition metal compounds.

These compounds may be used alone or in combination of two or more kinds. Further, these compounds may be used after diluted in hydrocarbon or halogenated hydrocarbon.

In the invention, metallocene compounds are preferably used after diluted in hydrocarbon medium.

Such metallocene compound as mentioned above can be supported on a carrier by bringing it into contact with a particulate carrier compound.

Examples of the carrier compounds include inorganic carrier compounds such as $SiO_2$, $Al_2O_3$, $B_2O_3$, $MgO$, $ZrO_2$, $CaO$, $TiO_2$, $ZnO$, $SnO_2$, $BaO$ and $ThO$; and resins such as polyethylene, polypropylene, poly-1-butene, poly-4-methyl-1-pentene and a styrene/divinylbenzene copolymer.

These carrier compounds may be used in combination of two or more kinds.

In the invention, a zirconocene compound having zirconium as its central metal atom and containing at least two ligands having a cyclopentadienyl skeleton is preferably used as the metallocene compound.

Next, the organoaluminum oxy-compound used in the preparation of catalyst (ii) is explained below.

The organoaluminum oxy-compound used in the invention may be a known aluminoxane, or may be a benzene-insoluble organoaluminum oxy-compound.

The known aluminoxane is concretely represented by the following formulas.

$$R_2Al\!-\!(OAl)_{\overline{m}}\!-\!OAlR_2$$
$$|$$
$$R$$

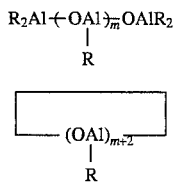

In the formulas, R is a hydrocarbon group such as methyl group, ethyl group, propyl group or butyl group, preferably methyl group or ethyl group, particularly methyl group, and m is an integer of not less than 2, preferably an integer of 5 to 40.

This aluminoxane may be formed from a mixture of alkyloxyaluminum unit represented by the formula $OAl(R^1)$ and alkyloxyaluminum unit represented by the formula $OAl(R^2)$. In the formulas, each of $R^1$ and $R^2$ is a hydrocarbon group, and examples of the hydrocarbon group are the same as those mentioned with respect to the above R, but $R^1$ and $R^2$ are different from each other.

The known aluminoxane is prepared, for example, by any of the following processes, and the resulting aluminoxane is generally obtained in the form of a solution of said aluminoxane in aromatic hydrocarbon medium.

(1) a process comprising adding an organoaluminum compound such as trialkylaluminum to an aromatic hydrocarbon suspension of a compound containing adsorbed water, or a salt containing water of crystallization such as magnesium chloride hydrate, copper sulfate hydrate, aluminum sulfate hydrate, nickel sulfate hydrate or cerous chloride hydrate, to react them with each other, and obtaining aluminoxane in the form of a solution of said aluminoxane in aromatic hydrocarbon medium;

(2) a process comprising adding water, ice or steam directly to an organoaluminum compound such as trialkylaluminum in a medium such as benzene, toluene, ethyl ether or tetrahydrofuran, and obtaining aluminoxane in the form of a solution of said aluminoxane in aromatic hydrocarbon medium; and (3) a process comprising reacting an organotinoxide such as dimethyltinoxide and dibutyltinoxide with an organoaluminum compound such as trialkylaluminum in a solvent such as decane, benzene or toluene.

Of these processes, the process (1) is preferably used.

Concrete examples of the organoaluminum compounds employable for preparing the solution of aluminoxane include:

trialkylaluminums such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these, trialkylaluminums and tricycloalkylaluminums are particularly preferred.

Also employable as the organoaluminum compound is isoprenylaluminum represented by the following formula:

$(i\!-\!C_4H_9)_xAl_y(C_5H_{10})_z$ wherein each of x, y and z is a positive integer, and $z \geq 2x$.

The above-exemplified organoaluminum compounds may be used singly or in combination.

The benzene-insoluble organoaluminum oxy-compound can be obtained, for example, by bringing a solution of aluminoxane into contact with water or an active hydrogen-containing compound or by bringing the above-mentioned organoaluminum compound into contact with water.

When the benzene-insoluble organoaluminum oxy-compound is analyzed by infrared spectrophotometry (IR), a ratio ($D_{1260}/D_{1220}$) of an absorbance ($D_{1260}$) at about 1260 $cm^{-1}$ to an absorbance ($D_{1220}$) at about 1220 $cm^{-1}$ is preferably not more than 0.09, more preferably not more than 0.08, particularly preferably in the range of 0.04 to 0.07.

The benzene-insoluble organoaluminum oxy-compound as mentioned above is presumed to have an alkyloxyaluminum unit represented by the following formula:

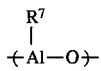

wherein $R^7$ is a hydrocarbon group of 1 to 12 carbon atoms. Concrete examples of the hydrocarbon group include methyl group, ethyl group, n-propyl group, isopropyl group, n-butyl group, isobutyl group, pentyl group, hexyl group, octyl group, decyl group, cyclohexyl group and cyclooctyl group. Of these, preferred are methyl group and ethyl group, and particularly preferred is methyl group.

In addition to the alkyloxyaluminum unit represented by the above formula, the benzene-insoluble organoaluminum oxy-compound may contain an oxyaluminum unit represented by the following formula:

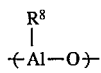

wherein $R^8$ is a hydrocarbon group of 1 to 12 carbon atoms, an alkoxy group of 1 to 12 carbon atoms, an aryloxy group of 6 to 20 carbon atoms, a hydroxyl group, halogen or hydrogen atom.

The group indicated by $R^8$ in the above formula is different from the group indicated by $R^7$ in the aforesaid formula.

In the case where the organoaluminum oxy-compound contains the oxyaluminum unit, it is desirable that the organoaluminum oxy-compound contains the alkyloxyaluminum unit in an amount of not less than 30% by mol, preferably not less than 50% by mol, more preferably not less than 70% by mol.

The organoaluminum oxy-compound used in the invention may contain an organic compound component of other metals than aluminum in a small amount.

Further, the organoaluminum oxy-compound may be used by supporting it on the above-mentioned carrier compound.

As the organoaluminum compound (2) optionally used in the present invention, there can be mentioned, for example, an organoaluminum compound represented by the following formula [b].

$$R^5{}_nAlX_{3-n} \quad [b]$$

wherein $R^5$ is hydrocarbon of 1–12 carbon atoms, X is halogen atom or hydrogen atom, and n is 1–3.

In the above-mentioned formula [b], $R^5$ is hydrocarbon group of 1–12 carbon atoms, such as, alkyl group, cycloalkyl group or aryl group, including concretely methyl group, ethyl group, n-propyl group, isopropyl group, isobutyl group, pentyl group, hexyl group, octyl group, cyclopentyl group, cyclohexyl group, phenyl group, tolyl group, etc.

The organoaluminum compounds include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds, there may also be used a compound represented by the following formula [b']:

$$R^5{}_nAlY_{3-n} \quad [b']$$

wherein $R^5$ is as defined above, Y is $-OR^6$ group, $-OSiR^7{}_3$ group, $-OAlR^8{}_2$ group, $-NR^9{}_2$ group, $-SIR^{10}{}_3$ group, or $-N(R^{11})AlR^{12}{}_2$ group, n is 1–2 and $R^6$, $R^7$, $R^8$ and $R^{12}$ are each methyl group, ethyl group, isopropyl group, isobutyl group, cyclohexyl group, phenyl group, trimethylsilyl group, etc; $R^9$ is hydrogen atom, methyl group, ethyl group, isopropyl group, phenyl group, trimethylsilyl group, etc; and $R^{10}$ and $R^{11}$ are each methyl group, ethyl group, etc.

The organoaluminum compounds include, in concrete, such compounds as mentioned below.

Compounds of the formula $R^5{}_nAl(OR^6)_{3-n}$ such as dimethylaluminum methoxide, diethylaluminum ethoxide, diisobutylaluminum methoxide, etc;

(ii) Compounds of the formula $R^5{}_nAl(OSiR^7{}_3)_{3-n}$ such as $Et_2Al(OSiMe_3)$, $(iso\text{-}Bu)_2Al(OSiMe_3)$, $(iso\text{-}Bu)_2Al(OSiEt_3)$, etc;

(iii) Compounds of the formula $R^5{}_nAl(OAlR^8{}_2)_{3-n}$ such as $Et_2AlOAlEt_2$, $(iso\text{-}Bu)_2AlOAl(iso\text{-}Bu)_2$, etc;

(iv) Compounds of the formula $R^5{}_nAl(NR^9{}_2)_{3-n}$ such as $Me_2AlNEt_2$, $Et_2AlNHMe$, $Me_2AlNHEt$, $Et_2AlN(SiMe_3)_2$, $(iso\text{-}Bu)_2AlN(SiMe_3)_2$, etc;

(v) Compounds of the formula $R^5{}_nAl(SiR^{10}{}_3)_{3-n}$ such as $(iso\text{-}Bu)_2AlSiMe_3$, etc; and (vi) Compounds of the formul

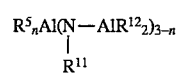

such as

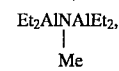

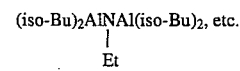

Among the organoaluminum compounds represented by the above formulas [b] and [b'], preferred are the organoaluminum compounds resepented by the formulas, $R^5{}_3Al$, $R^5{}_nAl(OR^6)_{3-n}$ and $R^5{}_nAl(OAlR^8{}_2)_{3-n}$. Particularly preferred is a compound in which $R^5$ is isoalkyl group, and n is 2. These organoaluminum compounds may be also used in combination of two or more kinds.

Further, the organoaluminum compound may be used by supporting it on the above-mentioned carrier compound.

The first cycloolefin copolymer compositions of the invention may be prepared, as mentioned above, by carrying out the copolymerization of an α-olefin at least 2 carbon atoms and a cycloolefin represented by the aforementioned formula [I] or [II] in a liquid phase, preferably in a hydrocarbon solvent, in the presence of the hydrocarbon elastomer (A-1) using the above-mentioned catalyst (i) or (ii).

The hydrocarbon solvent used in the above case includes aliphatic hydrocarbons such as pentane, hexane, heptane, octane, decane, dodecane and kerosene, and halogen derivatives thereof;

alicyclic hydrocarbons such as cyclohexane, methylcyclopentane and methylcyclohexane, and halogen derivatives thereof;

aromatic hydrocarbons such as benzene, toluene and xylene, and halogen derivatives such as chlorobenzene.

In the above-mentioned copolymerization reaction, the α-olefin or cycloolefin itself may be used as the hydrocarbon solvent. These solvents may be used as the mixture thereof.

In the present invention, it is desirable to carry out the above-mentioned copolymerization in the presence of the aforesaid hydrocarbon solvent, and when a mixture of such hydrocarbon solvents are used, it is desirable to carry out said copolymerization in the presence of mixed solvents such as cyclohexane/hexane, cyclohexane/heptane, cyclohexane/pentane, toluene/hexane, toluene/heptane and toluene/pentane.

The copolymerization is carried out preferably by the continuous method, though either the batch method or the continuous method is adoptable.

- In the above case, the concentration of the catalyst used is as in the following.

When the catalyst (i) is used, the amount of the soluble vanadium compound to be fed to the polymerization system is usually 0.01–5 mmol, preferably 0.05–3 mmol per the volume of 1 liter of the polymerization solution, and the amount of the organoaluminum compound to be fed to the polymerization system is 2 or more, preferably 2–50 and especially 3–20 in terms of the ratio (Al/V) of aluminum atom (Al) to vanadium atom (V) present in the polymerization system. When the copolymerization is carried out by the continuous method, the soluble vanadium compound is fed in the concentration of not more than 10 times, preferably 1–7 times and especially 1–5 times that of the soluble vanadium compound present in the polymerization system.

Usually, the soluble vanadium compound and organoaluminum compound are fed to the polymerization system after dilution respectively with the liquid monomers and/or the aforementioned hydrocarbon solvents. In this case, the soluble vanadium compound to be fed is desirably diluted to the above-mentioned concentration range, and the organoaluminum compound is fed in the concentration of, for example, not more than 50 times of the concentration of the polymerization system.

When the catalyst (ii) is used, the amount of the metallocene compound fed to the polymerization system is usually about 0.00005–0.1 mmol, preferably about 0.0001–0.05 mmol per the volume of 1 liter of the polymerization solution, and the organoaluminum oxy compound is fed in such an amount that aluminum atom of the organoaluminum oxy compound amounts usually about 1–10000 moles, preferably 10–5000 moles per mole of the transition metal atom of the metallocene compound. Further, the atomic ratio (A1-1/A1-2) of the aluminum atom (A1-1) of the organoaluminum compound used if necessary to the aluminum atom (A1-2) of the organoaluminum oxy compound is usually 0.02–3, preferably 0.05–1.5.

The copolymerization reactions in the presence of the above-mentioned catalyst (i) or (ii) are usually carried out at the temperature of −50° C. to 150° C., preferably −30° C. to 100° C. and especially −20° C. to 70° C. and the pressure employed is in excess of 0 but not more than 50 kg/cm$^2$, preferably in excess of 0 but not more than 20 kg/cm$^2$. The reaction time (average retention time when the copolymerization is carried out by the continuous method) is usually 5 minutes to 5 hours, preferably 10 minutes to 3 hours, though it varies according to the conditions employed such as the kind of monomers, concentration of catalyst and polymerization temperature.

In the above-mentioned copolymerization reaction, the α-olefin (a) of at least 2 carbon atoms and the cycloolefin (b) represented by the aforementioned formula [I] or [II] are fed to the polymerization system in such amounts that the molar ratio (a)/(b) becomes 1/99 to 90/10, preferably 5/95 to 50/50.

In carrying out the copolymerization, a chain transfer agent such as hydrogen may also be used for molecular weight control.

When the α-olefin (a) of at least 2 carbon atoms and the cycloolefin represented by the formula [I] or [II] are copolymerized in the presence of the hydrocarbon elastomer (A-1) component in the manner as mentioned above, there is obtained a solution containing a cycloolefin copolymer composition composed of the hydrocarbon elastomer (A-1) component and the cycloolefin copolymer (B-1) component. In such a solution as mentioned above, the cycloolefin copolymer composition is contained in a concentration of usually 10—500 g/l, preferably 10–300 g/l. This solution is treated in the usual way to obtain the desired cycloolefin copolymer composition.

More particularly, in preparing the first cycloolefin copolymer composition of the invention, the hydrocarbon elastomer (A-1) prepared in advance, for example, elastomer pellets or bales, is dissolved in a hydrocarbon solvent, and the α-olefin (a) of at least 2 carbon atoms and the cycloolefin (b) may be copolymerized in this solution, or the two-stage polymerization technique may be employed, wherein the hydrocarbon elastomer (A-1) as mentioned above is prepared first, and the α-olefin (a) of at least two carbon atoms and the cycloolefin (b) are copolymerized in the polymer solution.

The Second Cycloolefin Copolymer Composition

The second cycloolefin copolymer compositions of the present invention are illustrated below.

The second cycloolefin copolymer compositions of the invention are formed from a hydrocarbon elastomer (A-2) component containing a polymerizable double bond and a cycloolefin random copolymer (B-2) component obtained by copolymerization of the α-olefin (a) of at least 2 carbon atoms and the cycloolefin (b) in the presence of this hydrocarbon elastomer (A-2) component.

First, the hydrocarbon elastomer (A-2) containing a polymerizable double bond is illustrated.

Hydrocarbon elastomer (A-2)

The hydrocarbon elastomer (A-2) used in the present invention has a polymerizable double bond in the elastomer, said elastomer (A-2) including concretely (i) α-olefin/diene copolymers, (ii) α-olefin/cycloolefin/diene copolymers, and (iii) butadiene copolymers.

In the present invention, it is preferable to use α-olefin/cycloolefin/diene copolymers (ii), particularly a hydrocarbon elastomer (A-3) which will be mentioned later, as the hydrocarbon elastomer. When the hydrocarbon elastomer (A-3) is used, there are obtained cycloolefin copolymer compositions excellent particularly in transparency and impact resistance.

The α-olefin which forms the hydrocarbon elastomer (A-2) may include those having 2–20 carbon atoms, for example, ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Of these α-olefins, preferred is ethylene or propylene.

Preferably used as the dienes are non-conjugated dienes (c) represented by the following formulas [III]–[VI] and having 5–20 carbon atoms.

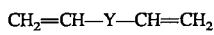
[III]

(Y is an alkylene group of 1–16 carbon atoms)

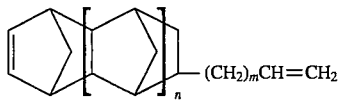
[IV]

(n is 0, 1 or 2; m is an integer of 0–11)

[V]

(n is 0, 1 or 2)

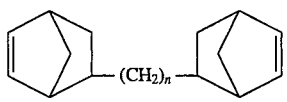
[VI]

(n is an integer of 1–6)

Exemplified as the non-conjugated diene represented by the above-mentioned formula [III] may be 1,4-pentadiene, 1,5-hexadiene, 1,6-heptadiene, 1,7-octadiene, 1,8-nonadiene, 1,9-decadiene, 1,11-dodecadiene and 1,19-eicodiene.

Exemplified as the diene represented by the above-mentioned formula [IV} may be as in the following.

5-Vinyl-bicyclo[2.2.1]hept-2-ene (=5-Vinyl-2-norbornene);

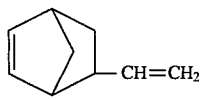

5-Allyl-bicyclo[2.2.1]hept-2-ene;

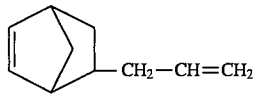

5-(3-Butenyl)-bicyclo[2.2.1]hept-2-ene;

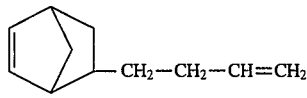

8-Vinyl-tetracyclo[4.4.0.1$^{2,5}$.1$^{7,10}$]-3-dodecene;

and

11-Vinyl-hexacyclo[6.6.1.1$^{3,6}$.1$^{10,13}$.0$^{2,7}$.0$^{9,14}$]-4-heptadecene;

Exemplified as the non-conjugated diene represented by the above-mentioned formula [V] may be as in the following.

Bicyclo[2.2.1]hept-2,5-diene (=norbornadiene);

Tetracyclo[4.4.0.1$^{2,5}$.1$^{7,10}$]-3,8-dodecadiene;

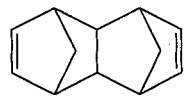

and

Hexacyclo[6.6.1.1$^{3,6}$.1$^{10,13}$.0$^{2,7}$.0$^{9,14}$]-4,11-heptadecadiene;

Exemplified as the non-conjugated diene represented by the above-mentioned formula [VI] are the compounds as listed below.

1,1-Bis(5-bicyclo[2.2.1]hept-2-enyl)methane;

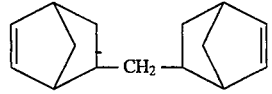

1,2-Bis(5-bicyclo[2.2.1]hept-2-enyl)ethane;

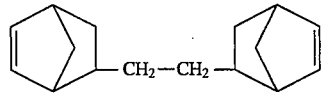

and
1,6-Bis(5-bicyclo[2.2.1]hept-2-enyl)hexane;

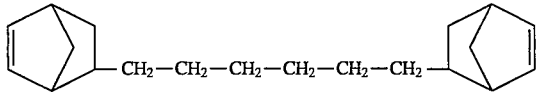

In the non-conjugated dienes (C), hydrogen atoms attached to carbon atoms other than those which form carbon-carbon double bond may be substituted with hydrocarbon groups.

Of the non-conjugated dienes (c) represented by the above formulas [III]–[VI], particularly preferred are 1,5-hexadiene, 1,7-octadiene, 1,9-decadiene, 5-vinylbicyclo [2.2.1] hept-2-ene, 8-vinyl-tetracyclo[4.4.0.1$^{2,5}$.1$^{7,10}$]-3-dodecene, bicyclo[2.2.1]hept-2,5-diene and tetracyclo [4.4.0.1$^{2,5}$.1$^{7,10}$] -3,8-dodecadiene. When such non-conjugated dienes (c) as illustrated above are used, there are obtained cycloolefin copolymer compositions excellent particularly in both transparency and impact resistance.

Used as the cycloolefin are concretely those as represented by the aforementioned formula [I] or [II].

Hereinafter, hydrocarbon elastomers having a polymerizable double bond are exemplified with the classification of dienes.

Concrete examples of the 1,5-hexadiene type copolymer include ethylene/1,5-hexadiene copolymer, propylene/1,5-hexadiene copolymer, 1-butene/1,5-hexadiene copolymer, 1-pentene/1,5-hexadiene copolymer, 1-hexene/1,5-hexadiene copolymer, 4-methyl-1-pentene/1,5-hexadiene copolymer, 1-octene/1,5-hexadiene copolymer, 1-decene/1,5-hexadiene copolymer, 1-dodecene/1,5-hexadiene copolymer, 1-tetradecene/1,5-hexadiene copolymer, 1-hexadecene/1,5-hexadiene copolymer, 1-octadecene/1,5-hexadiene copolymer, 1-eicosene/1,5-hexadiene copolymer, ethylene/propylene/1,5-hexadiene copolymer, ethylene/1-butene/1,5-hexadiene copolymer, ethylene/1-pentene/1,5-hexadiene copolymer, ethylene/1-hexene/1,5-hexadiene copolymer, ethylene/4-methyl-1-pentene/1,5-hexadiene copolymer, ethylene/1-octene/1,5-hexadiene copolymer, ethylene/1-decene/1,5-hexadiene copolymer, ethylene/1-dodecene/1,5-hexadiene copolymer, ethylene/1-tetradecene/1,5-hexadiene copolymer, ethylene/1-hexadecene/1,5-hexadiene copolymer, ethylene/1-octadecene/1,5-hexadiene copolymer, ethylene/1-eicosene/1,5-hexadiene copolymer, ethylene/norbornene/1,5-hexadiene copolymer, ethylene/5-methyl-2-norbornene/1,5-hexadiene copolymer, ethylene/5-ethyl-2-norbornene/1,5-hexadiene copolymer, ethylene/5-phenyl-2-norbornene/1,5-hexadiene copolymer, and ethylene/tetracyclododecene/1,5-hexadiene copolymer.

Concrete examples of the 1,7-octadiene type copolymer include ethylene/1,7-octadiene copolymer, propylene/1,7-octadiene copolymer, 1-butene/1,7-octadiene copolymer, 1-pentene/1,7-octadiene copolymer, 1-hexene/1,7-octadiene copolymer, 4-methyl-1-pentene/1,7-octadiene copolymer, 1-octene/1,7-octadiene copolymer, 1-decene/1,7-octadiene copolymer, 1-dodecene/1,7-octadiene copolymer, 1-tetradecene/1,7-octadiene copolymer, 1-hexadecene/1,7-octadiene copolymer, 1-octadecene/1,7-octadiene copolymer, 1-eicosene/1,7-octadiene copolymer, ethylene/propylene/1,7-octadiene copolymer, ethylene/1-butene/1,7-octadiene copolymer, ethylene/1-pentene/1,7-octadiene copolymer, ethylene/1-hexene/1,7-octadiene copolymer, ethylene/4-methyl-1-pentene/1,7-octadiene copolymer, ethylene/1-octene/1,7-octadiene copolymer, ethylene/1-decene/1,7-octadiene copolymer, ethylene/1-dodecene/1,7-octadiene copolymer, ethylene/1-tetradecene/1,7-octadiene copolymer, ethylene/1-hexadecene/1,7-octadiene copolymer, ethylene/1-octadecene/1,7-octadiene copolymer, ethylene/1-eicosene/1,7-octadiene copolymer, ethylene/norbornene/1,7-octadiene copolymer, ethylene/5-methyl-2-norbornene/1,7-octadiene copolymer, ethylene/5-ethyl-2-norbornene/1,7-octadiene copolymer, ethylene/5-phenyl-2-norbornene/1,7-octadiene copolymer, and ethylene/tetracyclododecene/1,7-octadiene copolymer.

Concrete examples of the 1,9-decadiene type copolymer include ethylene/1,9-decadiene copolymer, propylene/1,9-decadiene copolymer, 1-butene/1,9-decadiene copolymer, 1-pentene/1,9-decadiene copolymer, 1-hexene/1,9-decadiene copolymer, 4-methyl-1-pentene/1,9-decadiene copolymer, 1-octene/1,9-decadiene copolymer, 1-decene/1,9-decadiene copolymer, 1-dodecene/1,9-decadiene copolymer, 1-tetradecene/1,9-decadiene copolymer, 1-hexadecene/1,9-decadiene copolymer, 1-octadecene/1,9-decadiene copolymer, 1-eicosene/1,9-decadiene copolymer, ethylene/propylene/1,9-decadiene copolymer, ethylene/1-butene/1,9-decadiene copolymer, ethylene/1-pentene/1,9-decadiene copolymer, ethylene/1-hexene/1,9-decadiene copolymer, ethylene/4-methyl-1-pentene/1,9-decadiene copolymer, ethylene/1-octene/1,9-decadiene copolymer, ethylene/1-decene/1,9-decadiene copolymer, ethylene/1-dodecene/1,9-decadiene copolymer, ethylene/1-tetradecene/1,9-decadiene copolymer, ethylene/1-hexadecene/1,9-decadiene copolymer, ethylene/1-octadecene/1,9-decadiene copolymer, ethylene/1-eicosene/1,9-decadiene copolymer, ethylene/norbornene/1,9-decadiene copolymer, ethylene/5-methyl-2-norbornene/1,9-decadiene copolymer, ethylene/5-ethyl-2-norbornene/1,9-decadiene copolymer, ethylene/5-phenyl-2-norbornene/1,9-decadiene copolymer, and ethylene/tetracyclododecene/1,9-decadiene copolymer.

Concrete examples of the 5-vinylnorbornene type copolymer include ethylene/5-vinylnorbornene copolymer, propylene/5-vinylnorbornene copolymer, 1-butene/5-vinylnorbornene copolymer, 1-pentene/5-vinylnorbornene copolymer, 1-hexene/5-vinylnorbornene copolymer, 4-methyl-1-pentene/5-vinylnorbornene copolymer, 1-octene/5-vinylnorbornene copolymer, 1-decene/5-vinylnorbornene copolymer, 1-dodecene/5-vinylnorbornene copolymer, 1-tetradecene/5-vinylnorbornene copolymer, 1-hexadecene/5-vinylnorbornene copolymer, 1-octadecene/5-vinylnorbornene copolymer, 1-eicosene/5-vinylnorbornene copolymer, ethylene/propylene/5-vinylnorbornene copolymer, ethylene/1-butene/5-vinylnorbornene copolymer, ethylene/1-pentene/5-vinylnorbornene copolymer, ethylene/1-hexene/5-vinylnorbornene copolymer, ethylene/4-methyl-1-pentene/5-vinylnorbornene copolymer, ethylene/1-octene/5-vinylnorbornene copolymer, ethylene/1-decene/5-vinylnorbornene copolymer, ethylene/1-dodecene/5-vinylnorbornene copolymer, ethylene/1-tetradecene/5-vinylnorbornene copolymer, ethylene/1-hexadecene/5-vinylnorbornene copolymer, ethylene/1-octadecene/5-vinylnorbornene copolymer, ethylene/1-eicosene/5-vinylnorbornene copolymer, ethylene/norbornene/5-vinylnorbornene copolymer, ethylene/5-methyl-2-norbornene/5-vinylnorbornene copolymer, ethylene/5-ethyl-2-norbornene/5-vinylnorbornene copolymer, ethylene/5-phenyl-2-norbornene/5-vinylnorbornene copolymer, and ethylene/tetracyclododecene/5-vinylnorbornene copolymer.

Further, the cycloolefin elastomer (A-3) obtained by copolymerization of (a) an α-olefin of at least two carbon atoms, (b) a cycloolefin represented by the aforementioned formula [I] or [II] and (c) a non-conjugated diene having 5 to 20 carbon atoms include, in concrete, such compounds exemplified as follows.

The cycloolefin elastomer (A-3) containing units derived from the non-conjugated diene represented by the formula [III] include ethylene/norbornene/1,5-hexadiene copolymer, ethylene/5-methyl-2-norbornene/1,5-hexadiene copolymer, ethylene/5-ethyl-2-norbornene/1,5-hexadiene copolymer, ethylene/5-phenyl-2-norbornene/1,5-hexadiene copolymer, ethylene/1,4-methano-1,4,4a,9a-tetrahydrofluorene/1,5-hexadiene copolymer, ethylene/tetracyclododecene/1,5-hexadiene copolymer, ethylene/norbornene/1,7-octadiene copolymer, ethylene/5-methyl-2-norbornene/1,7-octadiene copolymer, ethylene/5-ethyl-2-norbornene/1,7-octadiene copolymer, ethylene/5- phenyl-2-norbornene/1,7-octadiene copolymer, ethylene/1,4-methano-1,4,4a,9a-tetrahydrofluorene/1,7-octadiene copolymer, ethylene/tetracyclododecene/1,7-octadiene copolymer, ethylene/norbornene/1,9-decadiene copolymer, ethylene/5-methyl-2-norbornene/1,9-decadiene copolymer, ethylene/5-ethyl-2-norbornene/1,9-decadiene copolymer, ethylene/5-phenyl-2-norbornene/1,9-decadiene copolymer, ethylene/1,4-methano-1,4,4a,9a-tetrahydrofluorene/1,9-decadiene copolymer and ethylene/tetracyclododecene/1,9-decadiene copolymer.

The cycloolefin elastomer (A-3) containing units derived from the non-conjugated diene represented by the formula [IV] include ethylene/norbornene/5-vinyl-bicyclo[2.2.1]hept-2-ene copolymer, ethylene/5-methyl-2-norbornene/5-vinyl-bicyclo[2.2.1]hept-2-ene copolymer, ethylene/5-ethyl-2-norbornene/5-vinyl-bicyclo[2.2.1]hept-2-ene copolymer, ethylene/5-phenyl-2-norbornene/5-vinyl-bicyclo[2.2.1]hept-2-ene copolymer, ethylene/1,4-methano-1,4,4a,9a-tetrahydrofluorene/5-vinyl-bicyclo[2.2.1]hept-2-ene copolymer and ethylene/tetracyclododecene/5-vinyl-bicyclo[2.2.1]hept-2-ene copolymer.

The cycloolefin elastomer (A-3) containing units derived from the non-conjugated diene represented by the formula [V] include ethylene/norbornene/bicyclo[2.2.1]hept-2,5-diene copolymer, ethylene/5-methyl-2-norbornene/bicyclo[2.2.1]hept-2,5-diene copolymer, ethylene/5-ethyl-2-norbornene/bicyclo[2.2.1]hept-2,5-diene copolymer, ethylene/5-phenyl-2-norbornene/bicyclo[2.2.1]hept-2,5-diene copolymer, ethylene/1,4-methano-1,4,4a,9a-tetrahydrofluorene/bicyclo[2.2.1]hept-2,5-diene copolymer, ethylene/tetracyclododecene/bicyclo[2.2.1]hept-2,5-diene copolymer, ethylene/norbornene/tetracyclo[4.4.0.1$^{2,5}$.1$^{7,10}$]-3,8-dodecadiene copolymer, ethylene/5-methyl-2-norbornene/tetracyclo[4.4.0.1$^{2,5}$.1$^{7,10}$]-3,8-dodecadiene copolymer, ethylene/5-ethyl-2-norbornene/tetracyclo[4.4.0.1$^{2,5}$.1$^{7,10}$]-3,8-dodecadiene copolymer, ethylene/5-phenyl-2-norbornene/tetracyclo[4.4.0.1$^{2,5}$.1$^{7,10}$]-3,8-dodecadiene copolymer, ethylene/1,4-methano-1,4,4a,9a-tetrahydrofluorene/tetracyclo[4.4.0.1$^{2,5}$.1$^{7,10}$]-3,8-dodecadiene copolymer and ethylene/tetracyclododecene/tetracyclo[4.4.0.1$^{2,5}$.1$^{7,10}$]-3,8-dodecadiene copolymer.

The cycloolefin elastomer (A-3) containing units derived from the non-conjugated diene represented by the formula [VI] include ethylene/norbornene/1,1-bis(5-bicyclo[2.2.1]hept-2-enyl)methane copolymer, ethylene/5-methyl-2-norbornene/1,1-bis(5-bicyclo[2.2.1]hept-2-enyl)methane copolymer, ethylene/5-ethyl-2-norbornene/1,1-bis(5-bicyclo[2.2.1]hept-2-enyl)methane copolymer, ethylene/5-phenyl-2-norbornene/1,1-bis(5-bicyclo[2.2.1]hept-2-enyl)methane copolymer, ethylene/1,4-methano-1,4,4a,9a-tetrahydrofluorene/bis(5-bicyclo[2.2.1]hept-2-enyl)methane copolymer and ethylene/tetracyclododecene/1,1-bis(5-bicyclo[2.2.1]hept-2-enyl)methane copolymer.

An intrinsic viscosity [η], as measured in decalin at 135° C., of these hydrocarbon elastomers (A-2) is 0.05–10 dl/g, preferably 0.5–5 dl/g and especially 0.7–4 dl/g.

Particularly, an intrinsic viscosity [η], as measured in decalin at 135° C., of the cycloolefin elastomers (A-3) is 0.5–5 dl/g, preferably 0.7–4 dl/g.

A glass transition temperature (Tg) of the hydrocarbon elastomers (A-2) and the cycloolefin elastomers (A-3) is less than 10° C., preferably less than 0° C.

An iodine value of the hydrocarbon elastomers (A-2) is usually 2–30 (g-iodine/100 g-polymer), preferably 3–30 (g-iodine/100 g-polymer) and especially 5–25 (g-iodine/100 g-polymer), and that of the cycloolefin elastomers (A-3) is usually 2–30 (g-iodine/100 g-polymer), preferably 5–25 (g-iodine/100 g-polymer).

When the hydrocarbon elastomer (A-2) used is the cycloolefin elastomer (A-3) comprising an α-olefin/cycloolefin/diene copolymer and when said copolymer contains the cycloolefin unit in an amount of usually 3 mol % or more, preferably 5 mol % or more, there is obtained a cycloolefin copolymer composition excellent in both transparency and impact strength.

Cycloolefin Random Copolymer (B-2)

The cycloolefin random copolymer (B-2) used in the invention is illustrated below.

The cycloolefin copolymers are obtained by copolymerization of the α-olefin (a) of at least 2 carbon atoms and the cycloolefin (b) in the presence of the above-mentioned hydrocarbon elastomer (A-2) containing a polymerizable double bond.

Particularly, when the hydrocarbon elastomer (A-2) used is the cycloolefin elastomer (A-3) obtained by copolymerization of (i) an α-olefin of at least 2 carbon atoms, (ii) a cycloolefin represented by the aforementioned formula [I] or [II], and (iii) the above-mentioned non-conjugated diene having 5–20 carbon atoms, wherein the copolymer obtained contains the cycloolefin unit in an amount of not less than 3 mol %, has an intrinsic viscosity [η], as measured in decalin at 135° C., of 0.5–5.0 dl/g, a glass transition temperature (Tg) of less than 10° C., a polymerizable carbon-carbon double bond and an iodine value of 2–30 (g-iodine/100 g-polymer), the resulting cycloolefin copolymer composition is excellent in transparency and impact resistance.

The α-olefins (a) used in forming the cycloolefin random copolymer (B-2) are the same as used in the preparation of the first cycloolefin copolymer composition of the invention as aforesaid.

Of these α-olefins, preferred is ethylene or propylene. These α-olefins may be used either singly or in combination of two or more.

Used as the cycloolefins (b) are those represented by the aforementioned formula [I] or [II].

These cycloolefins (b) may be used either singly or in combination of two or more.

Cycloolefin Copolymer Composition

The second cycloolefin copolymer compositions of the present invention are formed from the above-mentioned hydrocarbon elastomer (A-2) component and the cycloolefin copolymer (B-2) component obtained by copolymerization of the α-olefin (a) of at least 2 carbon atoms and the cycloolefin (b) represented by the aforementioned formula [I] or [II] in the presence of the hydrocarbon elastomer (A-2) component.

This cycloolefin copolymer composition contains the hydrocarbon elastomer (A-2) component in an amount of 1–50% by weight, preferably 3–40% by weight, further preferably 8–40% by weight and especially 10–30% by weight. In particular, when the cycloolefin elastomer (A-3) is used as the hydrocarbon elastomer (A-2) and said cycloolefin elastomer (A-3) is contained in the composition in an amount of 8–40% by weight, particularly preferably 10–30% by weight, the resulting cycloolefin copolymer composition is excellent both in transparency and impact resistance.

When this cycloolefin copolymer composition contains the above-mentioned cycloolefin elastomer (A-3) component, a sheet of 2 mm thick formed therefrom has a light transmittance (as measured at 780 nm) of 65% or more, preferably 68% or more, and is excellent in transparency in addition to impact strength.

The second cycloolefin copolymer compositions of the invention as mentioned above are obtained by preparing the cycloolefin copolymer (B-2) component by copolymerization of α-olefin (a) of at least 2 carbon atoms and the cycloolefin (b), and it is considered that at least a part of said cycloolefin copolymer (B-2) component and that of the hydrocarbon elastomer (A-2) component are bonded chemically together.

This matter is shown by the fact that the second cycloolefin random copolymer compositions of the invention are superior in impact strength to a corresponding cycloolefin copolymer composition obtained by simply blending the cycloolefin random copolymer component obtained by copolymerization of the α-olefin (a) of at least 2 carbon atoms and the cycloolefin (b) in the absence of the above-mentioned hydrocarbon elastomer (A-2), with the above-mentioned hydrocarbon elastomer (A-2) component. Particularly, when the cycloolefin elastomer (A-3) is used as the hydrocarbon elastomer (A-2), the resulting composition is excellent in both transparency and impact strength. In the second cycloolefin copolymer compositions of the invention as illustrated above, at least a part of the cycloolefin copolymer (B-2) component and that of the hydrocarbon elastomer (A-2) component are chemically bonded together, and hence dispersion of the (A-2) phase in the (B-2) phase is made fovorably to give the copolymer improved in impact resistance and transparency.

In the second cycloolefin copolymer compositions of the invention, the cycloolefin copolymer (B-2) component may be copolymerized, in addition to the α-olefin (a) of at least 2 carbon atoms and the cycloolefin (b), with a cycloolefin (other cycloolefin) other than the cycloolefins represented by the above-mentioned formula [I] or [II] to such an extent that properties of said copolymer compositions are not marred.

By the term "other cycloolefin" as used herein is meant a wider concept of unsaturated polycyclic hydrocarbon compounds excluding the cycloolefins represented by the above-mentioned formula [I] or [II].

More particularly, examples of the other cycloolefin includes cyclobutene, cyclopentene, cyclohexene, 3,4-dimethylcyclopentene, 3-methylcyclohexene, 2-(2-methylbutyl)-1-cyclohexene, styrene, α-methylstyrene and 3a,5,6,7a-tetrahydro-4,7-metano-1H-indene.

The second cycloolefin copolymer compositions of the invention may be obtained by copolymerizing (a) an α-olefin of at least 2 carbon atoms with (b) a cycloolefin represented by the aforementioned formula [I] or [II] in a liquid phase, preferably in a hydrocarbon solvent, in the presence of the above-mentioned hydrocarbon elastomer (A-2), preferably the cycloolefin elastomer (A-3), to form the cycloolefin random copolymer (B-2) component, said copolymerization being carried out in such a manner that the (A-2) component (or the (A-3) component) may exist in an amount of 1–50% by weight, preferably 3–40% by weight in the resulting copolymer composition.

Particularly, when the cycloolefin elastomer (A-3) is used as the hydrocarbon elastomer (A-2) in the above case, the amount of the (A-3) component in the resulting copolymer composition is 8–40% by weight, preferably 10–35% by weight.

When the above-mentioned hydrocarbon elastomer (A-2) is prepared and when a copolymer of the above-mentioned α-olefin (a) and cycloolefin (b) is prepared in the presence of the hydrocarbon elastomer (A-2), a transition metal catalyst is used in both cases. Concretely, usable catalysts are those as mentioned previously, including (i) catalysts formed from soluble vanadium compounds and organoaluminum compounds, or (ii) catalysts formed from metallocene compounds of transition metals selected from the Group IV B of the periodic table or lanthanides series, organoaluminum oxy compounds and, if necessary, organoaluminum compounds.

In the present invention, the cycloolefin copolymer (B-2) is prepared by copolymerization of the α-olefin of at least 2 carbon atoms and the cycloolefin represented by the aforementioned formula [I] or [II] in a liquid phase, preferably in a hydrocarbon solvent, in the presence of the hydrocarbon elastomer (A-2) using the catalyst (i) or (ii) as mentioned above.

The hydrocarbon solvent as used above may include those used in the preparation of the aforementioned first cycloolefin copolymer composition of the invention. The above-mentioned copolymerization reaction may be carried out by using the α-olefin or cycloolefin itself as the hydrocarbon solvent. These solvents may be used in admixture.

In the present invention, it is preferable to conduct the above-mentioned copolymerization in the presence of the above-mentioned hydrocarbon solvents, and when the solvent is used in admixture, said copolymerization is preferably carried out in such mixed solvents such as cyclohexane/hexane, cyclohexane/heptane, cyclohexane/pentane, toluene/hexane, toluene/heptane and toluene/pentane.

The copolymerization is preferably carried out by the continuous method, though either the batch method or the continuous method is applicable. In the above case, the concentration of the catalyst used is as in the following.

When the catalyst (i) is used, fed to the polymerization system is the soluble vanadium compound in an amount of usually 0.01–5 mmols, preferably 0.05–3 mmols per volume of 1 liter of the polymerization solution, and the organoaluminum compound (A1) is fed to the polymerization system in an amount of 2 or more, preferably 2–50 and especially 3–20 in terms of the (A1/V) ratio of the aluminum atom to the vanadium atoms present in the polymerization system. Further, when the polymerization is carried out by the continuous method, the concentration of the vanadium compound to be fed to the polymerization system is not more than 10 times, preferably 1–7 times and especially 1–5 times the concentration of the soluble vanadium compound present in the polymerization system.

Usually, the soluble vanadium compound and organoaluminum compound are fed to the polymerization system after dilution respectively with the liquid monomer and/or the above-mentioned hydrocarbon solvents. In that case, the soluble vanadium compound is desirably diluted to the above-mentioned concentration range, and the organoaluminum compound is fed in the concentration of, for example, not more than 50 times of the concentration of the polymerization system.

When the catalyst (ii) is used, the amount of the metallocene compound fed to the polymerization system is usually about 0.00005–1.0 mmol, preferably about 0.0001–0.3 mmol per the volume of 1 liter of the polymerization solution, and the organoaluminum oxy compound is fed in such an amount that the aluminum atom of the organoaluminum oxy compound amounts usually 1–10000 moles, preferably 10–5000 moles per mole of the transition metal atom of the metallocene compound. Further, the atomic ratio (A1-1/A1-2) of the aluminum atom (A1-1) of the organoaluminum compound used if necessary to the aluminum atom (A-2) of the organoaluminum oxy compound is usually 0.02–3, preferably 0.05–1.5.

The copolymerization reactions in the presence of the above-mentioned catalyst (i) or (ii) are usually carried out at the temperature of −50° C. to 150° C., preferably −30° C. to 150° C. and especially −20° C. to 100° C. and the pressure employed is in excess of 0 to 50 kg/cm², preferably in excess of 0 to 20 kg/cm². The reaction time (average retention time when the copolymerization is carried out by the continuous method) is usually 5 minutes to 5 hours, preferably 10 minutes to 3 hours, though it varies according to the conditions employed such as the kind of monomers, concentrations of the catalysts and polymerization temperature.

In the above-mentioned copolymerization reaction, the α-olefin (a) of at least 2 carbon atoms and the cycloolefin (b) represented by the aforementioned formula [I] or [II] are fed to the polymerization system in such amounts that the molar ratio (a)/(b) becomes 1/99 to 90/10, preferably 5/95 to 50/50.

In carrying out the copolymerization, a chain transfer agent such as hydrogen may be used for molecular weight control.

When the α-olefin of at least 2 carbon atoms and the cycloolefin represented by the formula [I] or [II] are copolymerized in the presence of the hydrocarbon elastomer (A-2), preferably the cycloolefin elastomer (A-3) to prepare the cycloolefin copolymer (B-2), there is obtained a solution containing a cycloolefin composition composed of the hydrocarbon elastomer (A-2) component (or (A-3) component) and the cycloolefin copolymer (B-2) component. In such a solution as mentioned above, the cycloolefin copolymer composition is contained in a concentration of usually 10–500 g/l, preferably 10–300 g/l. This solution is treated in the usual way to obtain the desired cycloolefin copolymer composition.

More particularly, in preparing the second cycloolefin copolymer compositions of the invention, the hydrocarbon elastomer (A-2), preferably the cycloolefin elastomer (A-3), prepared in advance, for example, elastomer pellets or bales, are dissolved in a hydrocarbon solvent, and the α-olefin (a) of at least 2 carbon atoms and the cycloolefin (b) may be copolymerized in this solution, or the two-stage polymerization technique may be employed, wherein the hydrocarbon elastomer (A-2), preferably the cycloolefin elastomer (A-3), is prepared first, and the α-olefin (a) of at least 2 carbon atoms and the cycloolefin (b) are copolymerized in the polymer solution.

The cycloolefin copolymer composition provided by the present invention may be processed by a conventional molding method, for example, extrusion molding, injection molding, blow molding and rotational molding by using single-screw extruder, vent type extruder, double-screw extruder, conical type double screw extruder, coneader, platificater, mixtruder, double conical screw extruder, planetary screw extruder, gear type extruder and screwless extruder.

The cycloolefin copolymer composition according to the invention may contain other rubber component to improve the impact strength of the above mentioned cycloolefin copolymer composition, provided that the object of the invention is not marred. Further, the composition may also contain various additives, for example, heat stabilizer, weathering stabilizer, antistatic agent, anti-slip agent, antiblocking agent, antifogging agent, lubricant, pigment, dye, natural oil, synthetic oil and wax, provided that the object of the invention is not marred.

Stabilizers to be used as optional components include, for example, phenolic antioxidants such as tetrakis[methylene-3-(3,5-di-t-butyl-4-hydroxyphenyl)-propionate]methane, alkyl ester of β-(3,5-di-t-butyl-4-hydroxyphenyl)propionic acid and 2,2'-oxamidobis[ethyl-3-(3,5-di-t-butyl-4-hydroxyphenyl)]propionate; aliphatic acid metal salts such as zinc stearate, calcium stearate and calcium 12-hydroxystearate; and aliphatic acid esters of polyhydric alcohols such as glycerin monostearate, glycerin monolaurate, glycerin distearate, pentaerythritol monostearate, pentaerythritol distearate and pentaerythritol tristearate. These stabilizers may be used singly or in combination. One of the examples of the combination is a use of tetrakis[methylene-3-(3,5-di-t-butyl-4-hydroxyphenyl)propionate]methane, zinc stearate and glycerin monostearate in combination.

In the present invention, particularly preferred is the use of the phenolic antioxidant and the aliphatic acid ester of polyhydric alcohol in combination. The aliphatic acid ester of polyhydric alcohol is preferably an aliphatic acid ester of polyhydric alcohol in which a part of alcoholic hydroxy group of the polyhydric alcohol having 3 or more hydroxy group is esterified. The aliphatic acid esters of polyhydric alcohols include, in concrete, aliphatic acid esters of glycerin such as glycerin monostearate, glycerin monolaurate, glycerin monomyristate, glycerin monopalmitate, glycerin distearate and glycerin dilaurate; and aliphatic acid esters of pentaerythritol such as pentaerythritol monostearate, pentaerythritol monolaurate, pentaerythritol dilaurate, pentaerythritol distearate and pentaerythritol tristearate. The phenolic stabilizer is used in an amount of 0 to 10 parts by weight, preferably 0 to 5 parts by weight, more preferably 0 to 2 parts by weight, based on 100 parts by weight of the cycloolefin resin. The aliphatic acid ester of the polyhydric alcohol is used in an amount of 0 to 10 parts by weight, preferably 0 to 5 parts by weight, based on 100 parts by weight of the cycloolefin resin.

Further, in the present invention, the cycloolefin random copolymer composition may include, provided that the object of the invention is not marred, fillers such as silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powder, molybdenum sulfide, boron fibers, silicon carbide fibers, fibers of polymer of α-olefin having 2 or more carbon atoms, polypropylene fibers, polyester fibers and polyamide fibers.

EFFECT OF THE INVENTION

The first cycloolefin copolymer compositions of the present invention are formed from the hydrocarbon elastomer (A-1) component substantially free from a polymerizable double bond and the cycloolefin random copolymer (B-1) obtained by copolymerization of the α-olefin (a) of at least 2 carbon atoms and the cycloolefin (b) in the presence of said hydrocarbon elastomer (A-1) component, and hence the dispersion of the cycloolefin random copolymer (B-1) phase in the elastomer (A-1) phase is favorable and the thus obtained compositions are excellent in impact strength.

The second cycloolefin copolymer compositions of the invention are formed from the hydrocarbon elastomer (A-2) component having a polymerizable carbon-carbon double bond and the cycloolefin copolymer (B-2) component obtained by copolymerization of the α-olefin (a) of at least 2 carbon atoms and the cycloolefin (b) in the presence of said hydrocarbon elastomer (A-2) component, wherein at least parts of the cycloolefin copolymer (B-2) component and the hydrocarbon elastomer (A-2) component are chemically linked together. On this account, in the second cycloolefin copolymer compositions of the invention, the dispersion of the cycloolefin copolymer (B-2) phase and the hydrocarbon elastomer (A-2) phase is made favorable, and the resulting compositions are found to be excellent in impact strength. Particularly, when the cycloolefin elastomer (A-3) is used as the hydrocarbon elastomer (A-2) in the above case, the resulting cycloolefin copolymer compositions are found to be excellent particularly in transparency, said elastomer (A-3) being obtained by copolymerization of (a) and α-olefin of at least 2 carbon atoms, (b) a cycloolefin represented by the aforementioned formula [I] or [II] and (c) a non-conjugated diene having 5–20 carbon atoms.

The present invention is illustrated below with reference to examples, but it should be construed that the invention is in no way limited to those examples.

Shown below are the methods of measurement of various physical properties and evaluation of the result employed in the invention.

(1) Intrinsic viscosity [η]

The measurement was made with a Ubbelohde viscometer in decalin at 135° C.

(2) Glass transition temperature (Tg)

The measurement was made with a DSC-220C manufactured by Seiko Denshi Co., in the nitrogen atmosphere at a heating rate of 10° C./min.

(3) Softening temperature (TMA)

The measurement was made with a Thermo Mechanical Analyzer of Du Pont by means of heat deformation behavior of a sheet of 1 mm thick. That is, a load of 49 g was applied to a quartz needle place perpendicularly on the sheet and the temperature of said sheet was raised at a rate of 5° C./min, whereby a temperature of the sheet at which the needle penetrated by 0.635 mm into said sheet was taken as TMA.

(4) Iodine value

The measurement was made in accordance with JIS K3331 by means of the iodine monochloride method.

(5) MFR

The measurement was made in accordance with ASTM D1238 at 260° C. under a load of 2.16 kg.

(6) Preparation of test specimen

A test specimen was made by an injection molding machine IS50EPN of Toshiba Kikai K.K. and a prescribed mold for test specimen. After molding, the test specimen was allowed to stand at room temperature for 48 hours, followed by the measurement.

(7) Flexural test (FM)

The test was conducted in accordance with ASTM D790.

Shape of the test specimen: 5×½×⅛ t inch

Span: 51 mm (8) Izod impact test

The measurement was made in accordance with ASTM D256.

Shape of the test specimen: 5/2×⅛×½ t inch (notched)

Test temperature: 23° C.

(9) Light transmittance

A transmission at a wavelength of 780 nm of a visible spectrum obtained by measuring a pressed sheet of 2 mm thick used as a sample with a spectrophotometer MSP-2000 of Shimadzu Seisakusho was taken as a light transmittance.

EXAMPLE 1

With a 2-liter glass reactor equipped with a mixing blade, copolymerization of ethylene and tetracyclo [4.4.0.1$^{2,5}$.1$^{7,10}$]-3-dodecene (hereinafter abbreviated to "TCD") was carried out continuously in the presence of a hydrocarbon elastomer substantially free from a polymerizable double bond according to the following method.

A cyclohexane solution of an ethylene/propylene copolymer ([η]: 2.1 dl/g, Tg: −31° C.) was fed continuously from the top of the reactor at 0.5 l/hr so that a concentration of the ethylene/propylene copolymer in the reactor became 1.2 g/l. Further, a cyclohexane solution of TCD was fed continuously to the reactor in an amount of 0.4 l/hr so that the TCD concentration in the reactor became 65.7 g/l.

From the top of the reactor a cyclohexane solution of VO(OC$_2$H$_5$)Cl$_2$ as a catalyst was fed continuosly to the reactor at 0.7 l/hr (a concentration of vanadium to be fed at this time is 2.86 times that of the vanadium present in 1the reactor) so that the vanadium concentration in the reactor became 0.5 mmol/l, and a cyclohexane solution of ethylaluminumsesquichloride (Al (C$_2$H$_5$)$_{1.5}$Cl$_{1.5}$) as the catalyst was also fed continuously to the reactor at 0.4 l/hr so that the aluminum concentration in the reactor became 4.0 mmol/l. Further, through a bubbling tube, to the polymerization system were fed ethylene, nitrogen, and hydrogen in amounts of 30.0 l/hr, 7.0 l/hr, 3.0 l/hr, respectively.

The copolymerization was carried out while maintaining the polymerization system at 10° C. by circulating a cooling medium through a jacket provided outside the reactor. A solution of a cycloolefin copolymer composition comprising the ethylene/propylene copolymer and ethylene/TCD copolymer resulting from the above-mentioned copolymerization reaction was withdrawn continuously from the upper part of the reactor so that a volume of the polymer solution in the reactor constantly became 1 liter (that is, so that the average retention time became 0.5 hour). A (1:1) mixture of cyclohexane/isopropyl alcohol was added to the polymer solution to stop the polymerization reaction. Thereafter, an aqueous solution prepared by adding 5 ml of concentrated hydrochloric acid to 1 liter of water and the polymer solution are brought into contact with strong stirring in a proportion of 1:1 with a homomixer, thereby allowing the catalyst residue to migrate to the aqueous phase. After this contacted mixture was allowed to stand and then the aqueous phase was removed by separation, the remaining polymer phase was washed twice with distilled water to purify the polymer solution phase and separate it therefrom.

After bringing the polymer solution thus purified and separated into contact with strong stirring acetone in an amount of 3 times that of the polymer solution, the solid portion was collected by filtration, followed by thorough rinsing with acetone. Further, in order to extract TCD present in the polymer, the rinsed solid portion was poured into acetone so as to be 40 g/l, followed by extraction operation at 60° C. for 2 hours. After the extraction treatment, the solid portion was collected by filtration, and dried in a nitrogen stream at 130° C., 350 mmHg for 24 hours.

In the manner as mentioned above, there was obtained a cycloolefin copolymer composition comprising an ethylene/propylene copolymer ((A-1) component) and an ethylene/TCD copolymer (B-1) component) in an amount of 1.4 g/hr, i.e. 40.7 g/l. The proportion of the (A-1) component contained in the resulting copolymer composition was 2.9% by weight.

Table 1 shows the polymerization conditions employed, and Table 2 shows the obtained results, including the results obtained in the flexural test, impact resistance test, and TMA softening test.

EXAMPLE 2

Following the same procedure as in Example 1 except that the condition employed was changed as shown in Table 1, there was prepared a cycloolefin copolymer composition comprising an ethylene/propylene copolymer and an ethylene/TCD copolymer.

A test specimen was prepared from the thus obtained copolymer composition, and physical properties of the test specimen were evaluated. The results obtained are shown in Table 2.

EXAMPLES 3–5

Following the same procedure as in Example 1 except that the (A-1) components were changed individually to those shown in Table 1, there were prepared cycloolefin copolymer compositions comprising a hydrocarbon elastomer and an ethylene/TCD copolymer.

Test specimens were prepared from the thus obtained copolymer compositions, respectively, and physical properties of each test specimen were evaluated. The results obtained are shown in Table 2.

When various elastomers were used, a high impact resistance improving effect was exhibited in every system.

EXAMPLE 6

Following the same procedure as in Example 1 except that 1,4-methano-1,4,4a,9a-tetrahydrofluorene (hereinafter abbreviated to "MTHF") was used in place of TCD, there was prepared a cycloolefin copolymer composition comprising an ethylene/propylene copolymer and an ethylene/MTHF copolymer.

A test specimen was prepared from the thus obtained cycloolefin copolymer composition, and physical properties of the test specimen were evaluated. The results obtained are shown in Table 2.

EXAMPLE 7

Following the same procedure as in Example 1 except that ethylenebis(indenyl)zirconium dichloride [Et (Ind)$_2$ZrCl$_2$, concentration in the polymerization system: 0.2 mmol/l] and methylaluminoxane [MAO, Al concentration in the polymerization system: 20.0 mmol/l] were used as catalysts, and the polymerization conditions were changed to those shown in Table 1, there was prepared a cycloolefin copolymer composition comprising an ethylene/propylene copolymer and an ethylene/TCD copolymer.

A test specimen was prepared from the thus obtained copolymer composition, and physical properties of the test specimen were evaluated. The results obtained are shown in Table 2.

In this example also, the effect of improving impact strength by carrying out the copolymerization in the presence of the elastomer was made clear.

COMPARATIVE EXAMPLE 1

Following the same procedure as in Example 1 except that cyclohexane alone was added to the polymerization system in place of the cyclohexane solution of the ethylene/propylene copolymer, there was prepared an ethylene/TCD copolymer.

A test specimen was prepared from the thus obtained copolymer, and physical properties of the test specimen were evaluated. The results obtained are shown in Table 3.

COMPARATIVE EXAMPLE 2

Following the same procedure as in Example 6 except that cyclohexane alone used in place of the cyclohexane solution of the ethylene/propylene copolymer, there was prepared an ethylene/MTHF copolymer.

A test specimen was prepared from the thus obtained copolymer, and physical properties of the test sample were evaluated. The results obtained are shown in Table 3.

COMPARATIVE EXAMPLE 3

An ethylene/TCD copolymer (TCD content 30.1 mol %, 450 g) and an ethylene/propylene copolymer (50 g) were melt-blended with a twin-screw extruder (BT-30 of Plastic Kogaku Kenkyusho K.K., 1/D=42) at a cylinder temperature of 270° C., and the resulting blend was pelletized with a pelletizer.

A test specimen was prepared from the thus obtained pellet, and physical properties of the test specimen were evaluated. The results obtained are shown in Table 3.

COMPARATIVE EXAMPLES 4–6

The same operation as in Comparative Example 3 was repeated except that in place of the ethylene/propylene copolymer there were used respectively elastomers shown in Table 3.

Test specimens were prepared from the thus obtained compositions, respectively, and physical properties of each specimen were evaluated. The results obtained are shown in Table 3.

TABLE 1

| | [A-1] component | | | | Cycloolefin | | Amount of gas fed | | |
|---|---|---|---|---|---|---|---|---|---|
| | Kind of monomers constituting [A-1] component | Tg (°C.) | [η] (dl/g) | amount fed (g/l) | Kind | Amount fed (g/l) | Ethylene (l/hr) | N$_2$ (l/hr) | H$_2$ (l/hr) |
| Ex. 1 | Ethylene · propylene | −31 | 2.1 | 1.2 | TCD | 65.7 | 30.0 | 7.0 | 3.0 |
| Ex. 2 | Ethylene · propylene | −31 | 2.1 | 4.0 | TCD | 59.1 | 27.0 | 10.3 | 2.7 |
| Ex. 3 | Ethylene · propylene · ethylidenenorbornene | −35 | 3.0 | 4.0 | TCD | 59.1 | 30.0 | 7.0 | 3.0 |
| Ex. 4 | Ethylene · 5-ethyl-bicyclo[2.2.1]hept-2-ene | −18 | 3.6 | 4.0 | TCD | 59.1 | 30.0 | 7.0 | 3.0 |
| Ex. 5 | Ethylene · propylene · | −3 | 0.8 | 4.0 | TCD | 59.1 | 30.0 | 7.0 | 3.0 |

TABLE 1-continued

| | [A-1] component | | | | Polymerization conditions of cycloolefin random copolymer | | | | |
| | | | | | Cycloolefin | | Amount of gas fed | | |
| | Kind of monomers constituting [A-1] component | Tg (°C.) | [η] (dl/g) | amount fed (g/l) | Kind | Amount fed (g/l) | Ethylene (l/hr) | $N_2$ (l/hr) | $H_2$ (l/hr) |
|---|---|---|---|---|---|---|---|---|---|
| | tetracyclo[4.4.0.1$^{2,5}$.1$^{7,10}$]-3-dodecene | | | | | | | | |
| Ex. 6 | Ethylene · propylene | −31 | 2.1 | 4.0 | MTHF | 59.1 | 30.0 | 7.0 | 3.0 |
| Ex. 7 | Ethylene · propylene | −31 | 2.1 | 2.0 | TCD | 59.1 | 30.0 | 0 | 0 |

TABLE 2

| | Yield (polymer concn.) (g/l) | Proportion of [A-1] component in the polymer (wt %) | FM (kg/cm$^2$) | Izod (kg · cm/cm) (23° C., notched) | TMA (°C.) |
|---|---|---|---|---|---|
| Ex. 1 | 40.7 | 2.9 | 31100 | 2.2 | 147 |
| Ex. 2 | 38.8 | 10.3 | 27200 | 3.8 | 140 |
| Ex. 3 | 37.1 | 10.8 | 27000 | 4.9 | 141 |
| Ex. 4 | 35.7 | 11.2 | 27500 | 4.8 | 143 |
| Ex. 5 | 36.3 | 11.0 | 28100 | 4.6 | 145 |
| Ex. 6 | 44.5 | 9.0 | 28500 | 4.0 | 154 |
| Ex. 7 | 19.0 | 10.5 | 26900 | 4.3 | 140 |

TABLE 3

| | Kind of monomer constituting (A-1) component | Proportion [A-1] component in the polymer (wt %) | FM (kg/cm$^2$) | Izod (kg · cm/cm) (23° C. notched) | TMA (°C.) |
|---|---|---|---|---|---|
| Com. Ex. 1 | Not added | — | 32800 | 2.0 | 152 |
| Com. Ex. 2 | Not added | — | 33700 | 1.8 | 165 |
| Com. Ex. 3 | Ethylene · propylene | 10 | 26800 | 2.4 | 141 |
| Com. Ex. 4 | Ethylene · propylene · ethylidenenorbornene | 10 | 26300 | 3.1 | 142 |
| Com. Ex. 5 | Ethylene · 5-ethylbicyclo-[2.2.1]hept-2-ene | 10 | 27100 | 3.0 | 143 |
| Com. Ex. 6 | Ethylene · propylene · tetracyclo[4.4.0.1$^{2,5}$.1$^{7,10}$]-3-dodecene | 10 | 27700 | 2.9 | 143 |

EXAMPLE 8

With a 1-liter glass reactor equipped with a mixing blade, copolymerization of ethylene and TCD was carried out continuously in the presence of a hydrocarbon elastomer having a polymerizable double bond according to the following method.

A cyclohexane solution of an ethylene/propylene/vinylnorbornene copolymer ([η]=2.2 dl/g, iodine value=13.0, Tg=−41° C.) was fed continuously to the reactor from the top of the reactor at 0.5 l/hr so that a concentration of the ethylene/propylene/vinylnorbornene in the reactor became 1.2 g/l. Further, a cyclohexane solution of TCD was fed continuously to the reactor at 0.4 l/hr so that the TCD concentration in the reactor became 65.7 g/l.

Further, a cyclohexane solution of VO(OC$_2$H$_5$)Cl$_2$ as a catalyst was added to the reactor continuously at 0.7 l/hr (a concentration of vanadium to be fed at this time is 2.86 times that of vanadium present in the reactor) so that the vanadium concentration in the reactor became 0.5 mmol/l, and a cyclohexane solution of ethylaluminum sesquichloride (Al(C$_2$H$_5$)$_{1.5}$Cl$_{1.5}$) was fed continuously to the reactor at 0.4 l/hr so that the aluminum concentration in the reactor became 4.0 mmol/l. Further, through a bubbling tube, to the polymerization system were fed ethylene, nitrogen and hydrogen in amounts of 30.0 l/hr, 7.0 l/hr, and 3.0 l/hr, respectively.

The copolymerization was carried out while maintaining the polymerization system at 10° C. by circulating a cooling medium through a jacket provided outside the reactor. A polymer solution of the ethylene/TCD copolymer containing the ethylene/propylene/vinylnorbornene copolymer formed from the above-mentioned copolymerization reaction was withdrawn continuously from the reactor from the top of the reactor so that a volume of the polymer solution in the reactor constantly became 1 liter (that is, so that the average retention time became 0.5 hour). To the polymer solution thus withdrawn was added a (1:1) mixture of cyclohexane/isopropyl alcohol to stop polymerization reaction. Thereafter, an aqueous solution prepared by adding 5 ml of concentrated hydrochloric acid to 1 liter of water and the polymer solution are brought into contact together with strong stirring in a proportion of 1:1 with a homomixer, thereby allowing the catalyst residue to migrate to an aqueous phase. After this contacted mixture was allowed to stand and then the aqueous phase was removed by separation, the remaining polymer phase was rinsed twice with distilled water to purify the polymer solution phase and separate it therefrom.

After bringing the polymer solution thus purified and separated into contact with strong stirring acetone in an amount of 3 times that of the polymer solution, and the solid portion was collected by filtration, followed by thorough rinsing with acetone. Further, in order to extract TCD present in the polymer, the rinsed solid portion was poured into acetone so as to be 40 g/l, followed by extraction operation at 60° C. for 2 hours. After the extraction treatment, the solid portion was collected by filtration, and dried in a nitrogen stream at 130° C., 350 mmHg for 24 hours.

In the manner as mentioned above, there was obtained a cycloolefin copolymer composition comprising the ethylene/propylene/vinylnorbornene copolymer component ((A-2) component) and the ethylene/TCD copolymer component ((B-2) component) in an amount of 80.2 g/hr, i.e. 40.1 g/l. The polymerization conditions employed are shown in Table 4.

The proportion of the component (A-2) contained in the copolymer composition thus obtained was 3.0% by weight. MFR, as measured at 260° C. under a load of 2.16 kg was 8.0 g/10 min.

The results obtained, including the evaluated results obtained in the flexural test, impact strength test and TMA softening test are shown in Table 5.

EXAMPLES 9–10

Following the same procedure as in Example 8 except that the conditions employed were changed individually to those shown in Table 4, there were obtained respectively cycloolefin copolymer compositions comprising the ethylene/propylene/vinylnorbornene copolymer component and the ethylene/TCD copolymer component.

The results obtained are shown in Table 5.

COMPARATIVE EXAMPLES 7–9

Following the same procedure as in Example 8 except that the conditions employed were changed respectively to those shown in Table 4, there were prepared cycloolefin copolymer compositions comprising an ethylene/propylene/vinylnorbornene copolymer component and an ethylene/TCD copolymer component (Comparative Examples 7, 8) and an ethylene/TCD copolymer (Comparative Example 9).

The results obtained are shown in Table 5.

When the iodine value of the elastomer to be used deviated from the range as defined by the present invention toward to the direction of larger side, the resulting copolymer composition tended to contain gel, whereby said composition became incapable of being molded (Comparative Example 7). When the elastomer content in the copolymer is larger, deviating from the scope as defined by the invention, it was made clear that the heat resistance (TMA softening temperature) markedly decreases (Comparative Example 8).

Further, when the (A-2) component was not used, the resulting composition was found to be low in impact strength (Comparative Example 9).

EXAMPLE 11 AND COMPARATIVE EXAMPLE 10

Following the same procedure as in Example 8 except that the conditions employed were changed to those shown respectively in Table 4, there were prepared a cycloolefin copolymer composition comprising an ethylene/propylene/vinylnorbornene copolymer component and an ethylene/norbornene copolymer component (Example 11) and an ethylene/norbornene copolymer (Comparative Example 10).

The results obtained are shown in Table 5.

Even when norbornene was used in place of TCD, it was found that the impact strength improving effect almost similar to TCD was available.

EXAMPLE 12 AND COMPARATIVE EXAMPLE 11

Following the same procedure as in Example 8 except that the conditions employed were changed to those shown respectively in Table 4, there were prepared a cycloolefin copolymer composition (Example 12) comprising an ethylene/propylene/vinylnorbornene copolymer component and an ethylene/TCD copolymer component, and an ethylene/TCD copolymer (Comparative Example 11).

The result obtained are shown in Table 5.

Even a copolymer composition prepared under the conditions where the TCD content was higher, it was found to exhibit an almost similar impact resistance improving effect.

EXAMPLES 13–16

Following the same procedure as in Example 8 except that the conditions employed were changed to those shown in Table 4, there were prepared respectively cycloolefin copolymer compositions comprising a polymerizable double bond containing hydrocarbon elastomer component and an ethylene/TCD copolymer component.

When various elastomers were used, a high impact resistance improving effect was exhibited in every case.

Further, the light transmittance of the composition obtained in Example 15 was 71%, exhibiting a high transparency.

EXAMPLE 17 AND COMPARATIVE EXAMPLE 12

Following the same procedure as in Example 8 except that ethylenebisindenyl zirconium dichloride (Et $(Ind)_2ZrCl_2$, concentration in the polymerization system: 0.2 mmol/l) and methylaluminoxane [MAO, concentration in the polymerization system: 20.0 mmol/l] were used as catalysts and the conditions employed were changed to those shown respectively in Table 4, there were prepared a cycloolefin copolymer composition comprising an ethylene/propylene/vinylnorbornene copolymer component and an ethylene/TCD copolymer component (Example 17) and an ethylene/TCD bipolymer (Comparative Example 12).

The results obtained are shown in Table 5.

Hereupon, it was made clear that an impact resistance improving effect was available by carrying out the copolymerization in the presence of the elastomer.

TABLE 4(1)

| | [A-2] component | | | | |
|---|---|---|---|---|---|
| | Kind of monomer constituting [A-2] component | Tg (°C.) | Iodine value | [η] (dl/g) | Amount fed (g/l) |
| Ex. 8 | Ethylene · propylene · vinyl-norbornene | −41 | 13.0 | 2.2 | 1.2 |
| Ex. 9 | Ethylene · propylene · vinyl-norbornene | −41 | 13.0 | 2.2 | 4.0 |
| Ex. 10 | Ethylene · propylene · vinyl-norbornene | −38 | 25.2 | 3.7 | 2.0 |
| Ex. 11 | Ethylene · propylene · vinyl-norbornene | −41 | 13.0 | 2.2 | 3.0 |
| Ex. 12 | Ethylene · propylene · vinyl-norbornene | −41 | 13.0 | 2.2 | 3.0 |
| Ex. 13 | Propylene · ethylene · 1,9-decadiene | −34 | 14.3 | 4.1 | 2.0 |
| Ex. 14 | Propylene · ethylene · butene-1 · vinylnorbornene | −28 | 14.1 | 1.9 | 2.0 |
| Ex. 15 | Ethylene · TCD · tetracyclo[4.4.0.1$^{2,5}$.1$^{7,10}$]-3,8-dodecadiene | 5 | 9.1 | 1.3 | 4.0 |
| Ex. 16 | Octene · 1,9-decadiene · vinyl-norbornene | −40 | 12.0 | 3.5 | 2.0 |
| Ex. 17 | Ethylene · propylene · vinyl-norbornene | −41 | 13.0 | 2.2 | 4.0 |

| | Cycloolefin | | Amount of gas fed (l/hr) | | |
|---|---|---|---|---|---|
| | Kind | Amount fed (g/l) | Ethylene | N$_2$ | H$_2$ |
| Ex. 8 | TCD | 65.7 | 30.0 | 7.0 | 3.0 |
| Ex. 9 | TCD | 59.1 | 27.0 | 10.3 | 2.7 |
| Ex. 10 | TCD | 33.9 | 15.0 | 23.5 | 1.5 |
| Ex. 11 | Norbornene | 34.5 | 27.0 | 10.3 | 2.7 |
| Ex. 12 | TCD | 90.0 | 30.0 | 7.0 | 3.0 |
| Ex. 13 | TCD | 59.1 | 30.0 | 7.0 | 3.0 |
| Ex. 14 | TCD | 59.1 | 30.0 | 7.0 | 3.0 |
| Ex. 15 | TCD | 59.1 | 30.0 | 7.0 | 3.0 |
| Ex. 16 | TCD | 59.1 | 30.0 | 7.0 | 3.0 |
| Ex. 17 | TCD | 59.1 | 30.0 | 0 | 0 |

TABLE 4(2)

| | [A-2] component | | | | |
|---|---|---|---|---|---|
| | Kind of monomer constituting [A-2] component | Tg (°C.) | Iodine value | [η] (dl/g) | Amount fed (g/l) |
| Com. Ex. 7 | Ethylene · propylene · vinyl-norbornene | −31 | 33.0 | 2.2 | 1.2 |
| Com. Ex. 8 | Ethylene · propylene · vinyl-norbornene | −41 | 13.0 | 2.2 | 24.0 |
| Com. Ex. 9 | Not used | — | — | — | — |
| Com. Ex. 10 | Not used | — | — | — | — |
| Com. Ex. 11 | Not used | — | — | — | — |
| Com. Ex. 12 | Not used | — | — | — | — |

| | Cycloolefin | | Amount of gas fed (l/hr) | | |
|---|---|---|---|---|---|
| | Kind | Amount fed (g/l) | Ethylene | N$_2$ | H$_2$ |
| Com. Ex. 7 | TCD | 30.5 | 13.5 | 25.1 | 1.4 |
| Com. Ex. 8 | TCD | 29.6 | 13.5 | 25.1 | 1.4 |
| Com. Ex. 9 | TCD | 65.7 | 30.0 | 7.0 | 3.0 |
| Com. Ex. 10 | Norbornene | 38.5 | 30.0 | 7.0 | 3.0 |

TABLE 4(2)-continued

|  |  |  |  |  |  |
|---|---|---|---|---|---|
| Com. Ex. 11 | TCD | 90.0 | 30.0 | 7.0 | 3.0 |
| Com. Ex. 12 | TCD | 65.7 | 30.0 | 0 | 0 |

TABLE 5(1)

|  | Yield (g/l) (polymer concn.) | Proportion of [A-2] component in the polymer (wt %) | MFR (g/10 min) | FM (kg/cm²) | Izod (kg · cm/cm) (23° C., notched) | TMA (°C.) |
|---|---|---|---|---|---|---|
| Ex. 8 | 40.1 | 3.0 | 8.0 | 31800 | 2.1 | 149 |
| Ex. 9 | 39.4 | 10.2 | 6.7 | 26500 | 11.6 | 141 |
| Ex. 10 | 21.1 | 9.5 | 9.0 | 27000 | 10.8 | 143 |
| Ex. 11 | 29.6 | 10.1 | 5.4 | 21300 | 12.1 | 89 |
| Ex. 12 | 36.0 | 8.3 | 6.3 | 26300 | 10.9 | 153 |
| Ex. 13 | 19.1 | 10.5 | 9.1 | 27000 | 10.0 | 143 |
| Ex. 14 | 18.7 | 10.7 | 10.2 | 27100 | 9.8 | 144 |
| Ex. 15 | 41.5 | 9.6 | 8.0 | 28100 | 9.1 | 144 |
| Ex. 16 | 23.3 | 8.6 | 9.9 | 26900 | 10.1 | 143 |
| Ex. 17 | 20.1 | 19.9 | 3.2 | 20900 | 50.1 | 125 |

TABLE 5(2)

|  | Yield (g/l) (polymer concn.) | Proportion of [A-2] component in the polymer (wt %) | MFR (g/10 min) | FM (kg/cm²) | Izod (kg · cm/cm) (23° C., notched) | TMA (°C.) |
|---|---|---|---|---|---|---|
| Com. Ex. 7 | 19.8 | 10.1 | Unmeasurable (less than 0.01) |  | Because of a failure in molding operation, measurement was impracticable |  |
| Com. Ex. 8 | 38.3 | 62.7 | 0.3 | 4200 | N.B.* | Less than room temp. |
| Com. Ex. 9 | 41.8 | 0 | 9.0 | 33500 | 1.0 | 151 |
| Com. Ex. 10 | 29.5 | 0 | 13.2 | 28000 | 1.2 | 103 |
| Com. Ex. 11 | 33.8 | 0 | 5.8 | 35300 | 1.1 | 163 |
| Com. Ex. 12 | 15.1 | 0 | 4.5 | 33800 | 1.0 | 152 |

*Not broken (Example of preparation of cycloolefin elastomer (A-3))

With a 1-liter glass reactor equipped with a mixing blade, a cycloolefin elastomer (A-3) having a polymerizable carbon-carbon double bond was prepared in the following manner.

A glass reactor having an inner capacity of 1 liter and equipped with an agitating element was charged from the top of the reactor with a cyclohexane solution of norbornene (hereinafter abbreviated to "NB") and 5-vinyl-2-norbornene (hereinafter abbreviated to "VNB") at 0.4 l/hr so that the NB concentration in the reactor became 6.2 g/l and the VNB concentration became 2.0 g/l, a cyclohexane at 0.5 l/hr, a cyclohexane solution of $VO(OC_2H_5)Cl_2$ as a catalyst at 0.7 l/hr (a concentration of vanadium to be fed 5 at this time is 2.86 times that of the vanadium concentration in the reactor), so that the vanadium concentration in the reactor became 0.5 mmol/l, and a cyclohexane solution of iosbutylaluminum sesquichloride $(Al(C_4H_9)_{1.5}Cl_{1.5})$ at 0.4 l/hr so that the aluminum concentration in the reactor became 4.0 mmol/l. Further, through a bubbling tube, to the polymerization system were fed ethylene, nitrogen and hydrogen in amounts of 30.0 l/hr, 10 l/hr and 0.2 l/hr, respectively.

The copolymerization reaction was carried out while maintaining the polymerization system at 10° C. by circulating a cooling medium through a jacket provided outside the reactor. A polymer solution of an ethylene/NB/VNB copolymer formed by the above-mentioned copolymerization reaction was withdrawn continuously from the reactor from the top of the reactor so that a volume of the polymer solution in the reactor constantly became 1 liter (that is so that the average retention time becomes 0.5 hours). To the polymer solution thus withdrawn was added small amounts of methyl alcohol to stop the polymerization reaction. Thereafter, an aqueous solution prepared by adding 5 ml of concentrated hydrochloric acid to 1 liter of water and the polymer solution were brought into contact together with strong stirring in a proportion of 1:1 with a homomixer to migrate the catalyst residue to an aqueous phase. After this contacted mixture was allowed to stand and then the aqueous phase was removed by separation, the remaining polymer phase was rinsed twice with distilled water to purify the polymer solution phase and separate it therefrom. After bringing the polymer solution with strong stirring acetone in an amount of 3 times that of the polymer solution, the solid portion was collected by filtration, rinsed thoroughly with acetone and dried at 130° C., 350 mmHg for 12 hours.

In the manner as mentioned above, there was obtained the ethylene/NB/VNB copolymer in an amount of 25.4 g/hr, i.e. 12.7 g/l. In the copolymer thus obtained, the ethylene and NB concentrations were 86.2 mol % and 12.4 mol %, respectively, an intrinsic viscosity [η] was 2.02 dl/g, a glass transition temperature [Tg] as measured by DSC method was −5.8° C. and an iodine value was 13.2 g-iodine/100 g-polymer. Separately, 10 g of anhydrous magnesium sulfate was added to 1 liter of the polymer solution obtained by polymerization reaction of this example, and the mixture was shaken to carry out an operation to remove water contained in the polymer solution, followed by use in the polymerization reaction of Example 18.

EXAMPLE 18

With a 2-liter glass reactor equipped with a mixing blade, copolymerization of ethylene and TCD was carried out continuously in the presence of a cycloolefin elastomer (A-3) component having a polymerizable carbon-carbon double bond in the following manner.

The reactor was charged continuously from the top of the reactor thereof a cyclohexane solution of the ethylene/norbornene (NB)/vinylnorbornene (VNB) copolymer obtained in the example of preparation of the elastomer component mentioned above ([η]=2.02 dl/g, iodine value= 13.2, Tg=−5.8° C.) at 0.5 l/hr so that the concentration in the reactor of the ethylene/norbornene/vinylnorbornene copolymer became 6.9 gram/l. Further, a cyclohexane solution of TCD was fed continuously to the reactor at 0.4 l/hr so that the TCD concentration in the reactor became 60.0 gram/l. The reactor was further charged continuously from the top of the reactor a cyclohexane solution of $VO(OC_2H_5)Cl_2$ at 0.7 l/hr (a concentration of vanadium to be fed at this time is 2.86 times that of the vanadium concentration in the reactor) so that the vanadium concentration in the reactor became 0.5 mmol/l, and a cyclohexane solution of isobutylaluminum sesquichloride (Al $(C_4H_9)_{1.5}Cl_{1.5}$) at 0.4 l/hr so that the aluminum concentration in the reactor became 4.0 mmol/l, respectively. Further, through a bubbling tube, to the polymerization system were fed ethylene, nitrogen and hydrogen at 30.6 l/hr, 40.6 l/hr and 0.85 l/hr, respectively.

The copolymerization reaction was carried out while maintaining the polymerization system at 10° C. by circulating a cooling medium through a jacket provided outside the reactor. A solution of a cycloolefin copolymer composition comprising the ethylene/norbornene (NB)/vinylnorbornene (VNB) copolymer component and the ethylene/TCD component obtained by the above-mentioned copolymerization reaction was withdrawn continuously from the reactor through the upper part thereof so that the polymer solution constantly becomes 1 liter in the reactor (that is, in such a manner that the average retention becomes 0.5 hours). To the polymer solution was added a small amount of methanol to stop the polymerization reaction. Thereafter, an aqueous solution prepared by adding 5 ml of concentrated hydrochloric acid to 1 liter of water and the above-mentioned solution (polymer solution) were brought into contact together with strong stirring in a proportion of 1:1 with a homomixer.

After bringing the polymer solution thus purified and separated into contact with strong stirring acetone in an amount of 3 times that of the polymer solution, the solid portion was collected by filtration, followed by thorough rinsing with acetone. Further, in order to extract the TCD present in the polymer, the rinsed solid portion was poured into acetone so as to be 40 g/l, followed by extraction operation at 60° C. for 2 hours. After the extraction treatment, the solid portion was collected by filtration, and dried for 12 hours in a nitrogen stream at 130° C. and 350 mmHg.

In the manner as mentioned above, there was obtained a cycloolefin copolymer composition comprising the ethylene/norbornene (NB)/vinylnorbornene (VNB) copolymer component ((A-3) component) and the ethylene/TCD copolymer ((B-2) component) in an amount of 51.6 g/hour, that is 25.8 g/l. The proportion of the (A-3) component contained in the copolymer composition obtained was 26.7% by weight. The copolymer composition obtained had MFR, as measured at 260° C. and under a load of 2.16 kg, of 3.0 g/10 min. Further, this copolymer composition had Tg of 142° C.

The results obtained are shown in Table 6.

EXAMPLES 19–20 AND COMPARATIVE EXAMPLE 13

Following the same procedure as in Example 18 except that iodine values of the cycloolefin elastomers were changed respectively to those as shown in Table 6, there were obtained cycloolefin copolymer compositions comprising an ethylene/norbornene/vinylnorbornene copolymer and an ethylene/TCD copolymer component.

It was made clear that when the iodine value of the elastomer used deviates from the range as defined in the invention toward the higher side, MFR of the resulting copolymer composition could not be measured because of its poor melt flowability (no molding operation was operable).

EXAMPLES 21–22

Following the same procedure as in Example 18 except that the contents of the cycloolefin elastomers were changed to those as shown in Table 6, there were prepared cycloolefin copolymer compositions comprising an ethylene/norbornene/vinylnorbornene copolymer component and an ethylene/TCD copolymer component.

The results obtained are shown in Table 6.

EXAMPLE 23

Following the same procedure as in Example 18 except that the elastomer used was changed to such an ethylene/NB/1,9-decadiene copolymer as shown in Table 6, there was prepared a cycloolefin copolymer composition comprising the cycloolefin elastomer component and an ethylene/TCD copolymer component.

The results obtained are shown in Table 6.

EXAMPLE 24

Following the same procedure as in Example 18 except that the elastomer used was changed to such an ethylene/TCD/VNB copolymer as shown in Table 6, there was prepared a cycloolefin copolymer composition comprising a cycloolefin elastomer component and an ethylene/TCD copolymer component.

The results obtained are shown in Table 6.

EXAMPLE 25

Following the same procedure as in Example 18 except that the conditions employed were changed to those as shown in Table 6, there was prepared a cycloolefin copolymer composition comprising a polymerizable carbon-carbon double bond containing cycloolefin elastomer component and an ethylene/TCD copolymer component.

The results obtained are shown in Table 6.

COMPARATIVE EXAMPLE 14

Following the same procedure as in Example 18 except that the NB content and Tg of the cycloolefin elastomer were changed to those respectively as shown in Table 6, there was prepared a cycloolefin copolymer composition comprising an ethylene/NB/VNB copolymer component and an ethylene/TCD copolymer component The results obtained are shown in Table 6.

It was made clear that when Tg of the elastomer used deviates from the range as defined in the invention, no development of Izod impact resistance is observed.

TABLE 6

| | Elastomer component [A-3] | | | | |
|---|---|---|---|---|---|
| | Kind of elastomer | [η] (dl/g) | NB content (mol %) | Tg (°C.) | Iodine value (g-iodine/ 100 g-polymer) |
| Ex. 18 | Ethylene-NB-VNB | 2.02 | 12.4 | −5.8 | 13.2 |
| Ex. 19 | Ethylene-NB-VNB | 2.11 | 13.0 | −7.8 | 2.2 |
| Ex. 20 | Ethylene-NB-VNB | 2.07 | 12.5 | −6.0 | 6.1 |
| Ex. 21 | Ethylene-NB-VNB | 2.02 | 12.4 | −5.8 | 13.2 |
| Ex. 22 | Ethylene-NB-VNB | 2.02 | 12.4 | −5.8 | 13.2 |
| Ex. 23 | Ethylene-NB-1.9-DD | 2.11 | 13.2 | −5.8 | 5.9 |
| Ex. 24 | Ethylene-TCD-VNB | 1.98 | 7.4*[2] | 4.0 | 6.1 |
| Ex. 25 | Ethylene-NB-VNB | 2.02 | 12.4 | −5.8 | 13.2 |
| Com. Ex. 13 | Ethylene-NB-VNB | 2.15 | 12.4 | −8.0 | 32.6 |
| Com. Ex. 14 | Ethylene-NB-VNB | 2.11 | 21.1 | 17.8 | 12.3 |

| | Preparative conditions of [B-2] component in the presence of [A-3] component*[1] | | | | Physical properties of copolymer composition | | | | |
|---|---|---|---|---|---|---|---|---|---|
| | Cycloolefin kind | Cycloolefin concn. (g/l) | A-mount of ethylene fed (l/hr) | A-mount of [A-3] fed (g/l) | [A-3] content (wt %) | [B-2] Tg (°C.) | Izod impact strength (kg·cm/cm) | Light transmittance (%) | MFR (g/10 min) |
| Ex. 18 | TCD | 60.0 | 30.6 | 6.9 | 26.7 | 142 | 51 | 87 | 1.8 |
| Ex. 19 | TCD | 60.0 | 30.6 | 6.9 | 26.3 | 141 | 35 | 71 | 4.3 |
| Ex. 20 | TCD | 60.0 | 30.6 | 6.9 | 25.8 | 143 | 41 | 81 | 2.1 |
| Ex. 21 | TCD | 60.0 | 30.6 | 3.5 | 13.8 | 143 | 9 | 88 | 4.1 |
| Ex. 22 | TCD | 60.0 | 30.6 | 8.7 | 36.8 | 140 | 61 | 70 | 1.4 |
| Ex. 23 | TCD | 60.0 | 30.6 | 6.9 | 26.5 | 141 | 13 | 70 | 2.2 |
| Ex. 24 | TCD | 60.0 | 30.6 | 6.9 | 26.5 | 142 | 12 | 71 | 2.1 |
| Ex. 25 | TCD | 60.0 | 30.0 | 9.6 | 25.8 | 111 | 48 | 86 | 3.0 |
| Com. Ex. 13 | TCD | 60.0 | 30.0 | 6.9 | 25.8 | 141 | 3 | 89 | Unmeasurable*[3] |
| Com. Ex. 14 | TCD | 60.0 | 30.6 | 6.9 | 26.4 | 144 | 1 | 84 | 0.9 |

*[1]Amount of nitrogen fed = 40.6 l/hr, Amount of hydrogen fed = 0.85 l/hr, Amount of nitrogen fed only in Example 25 = 7.0 l/hr, Amount of hydrogen fed = 3.0 l/hr
*[2]TCD content
*[3]Unmeasurable because of a value of less than 0.01.

What is claimed is:

1. A cycloolefin copolymer composition comprising (A) a hydrocarbon elastomer (A-2) component obtained by copolymerization of (i) an α-olefin of at least 2 carbon atoms and
(iii) a non-conjugated diene of 5–20 carbon atoms and having an intrinsic viscosity (η), as measured in decalin at 135° C., of 0.05–10 dl/g, a glass transition temperature (Tg) of less than 10° C., a polymerizable carbon-carbon double bond, and an iodine value of 2–30 (g-iodine/100g-polymer), and (B) a cycloolefin copolymer (B-2) component obtained by copolymerization of (a) an α-olefin of at least 2 carbon atoms and
(b) a cycloolefin represented by the following formula (I) or (II), wherein the copolymerization to obtain the cycloolefin copolymer component (B-2) is carried out in the presence of the hydrocarbon elastomer (A-2) component and the hydrocarbon elastomer (A-2) component is chemically bound to the copolymer (B-2) component, and wherein said hydrocarbon elastomer (A-2) component exists in said composition in an amount of 1–50% by weight, and wherein said composition has improved impact resistance in comparison with the cycloolefin copolymer (B-2) component absent said elastomer component;

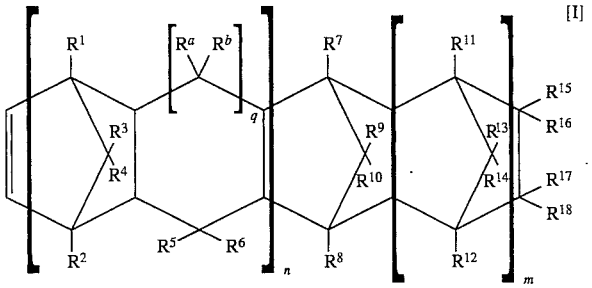

wherein n is 0 or 1; m is 0 or a positive integer; q is 0 or 1; $R^1$–$R^{18}$, $R^a$ and $R^b$ are each independently a hydrogen atom, a halogen atom or a hydrocarbon group; $R^{15}$–$R^{18}$ may be linked with one another to form a monocyclic or polycyclic group which may have a double bond; and $R^{15}$ and $R^{16}$, or $R^{16}$ and $R^{18}$ may together form an alkylidene group;

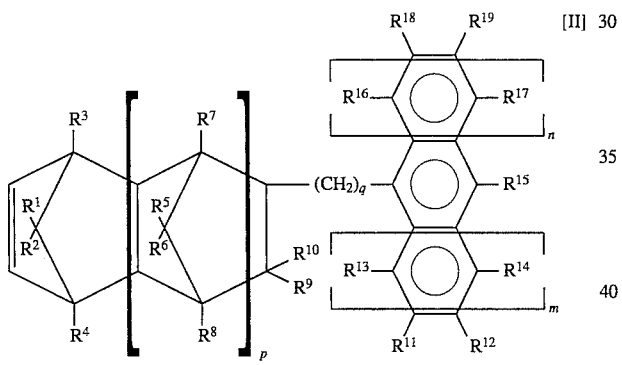

wherein each p and q is independently 0 or an integer of 1 or more; each of m and n is independently 0, 1 or 2; $R^1$–$R^{19}$ are each independently a hydrogen atom, a halogen atom, an aliphatic hydrocarbon group, an alicyclic hydrocarbon group, an aromatic hydrocarbon group or an alkoxy group; a carbon atom to which $R^9$ or $R^{10}$ is linked and a carbon atom to which $R^{13}$ or $R^{11}$ is linked may be bonded directly or by way of an alkylene group of 1–3 carbon atoms, and $R^{15}$ and $R^{12}$, or $R^{15}$ and $R^{19}$ may be linked together to form a monocyclic or polycyclic aromatic ring when each of n and m is 0.

2. A cycloolefin copolymer composition comprising (A) a cycloolefin elastomer (A-3) component obtained by copolymerization of (i) an α-olefin of at least 2 carbon atoms, (ii) a cycloolefin represented by the following formula (I) or (II) and (iii) a non-conjugated diene of 5–20 carbon atoms, said (A-3) component containing structural units derived from said cycloolefin in an amount of at least 3 mol %, and having an intrinsic viscosity (η), as measured in decalin at 135° C., of 0.05–5.0 dl/g, a glass transition temperature (Tg) of less than 10° C., and having a polymerizable carbon-carbon double bond and an iodine value of 2–30 (g-iodine/100 g-polymer), and (B) a cycloolefin copolymer (B-2) component obtained by copolymerization of (a) an α-olefin of at least 2 carbon atoms and (b) a cycloolefin represented by the following formula (I) or (II), wherein the copolymerization to obtain the cycloolefin copolymer component (B-2) is carried out in the presence of the hydrocarbon elastomer (A-3) component and the hydrocarbon elastomer (A-3) component is chemically bound to the copolymer (B-2) component, and wherein said cycloolefin elastomer (A-3) component exists in said composition in an amount of 8–40% by weight, with the proviso that a sheet of 2 mm thick formed from said composition has a light transmittance, measured at 780 nm, of at least 65%, and wherein said composition has improved impact resistance in comparison with the cycloolefin copolymer (B-2) component absent said elastomer component;

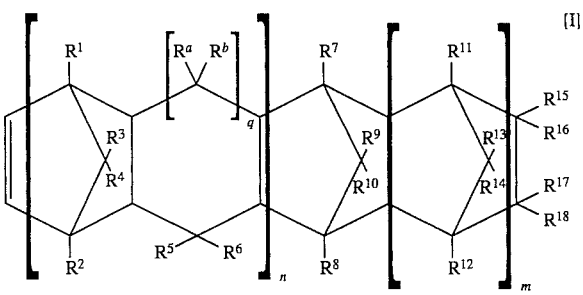

wherein n is 0 or 1; m is 0 or a positive integer; q is 0 or 1; $R^1$–$R^{18}$, $R^a$ and $R^b$ are each independently a hydrogen atom, a halogen atom or a hydrocarbon group; $R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group;

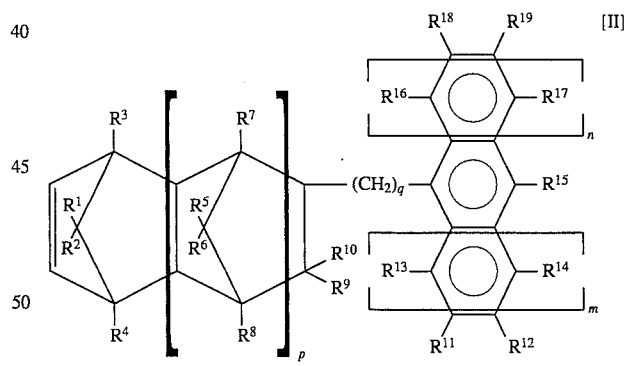

wherein each p and q is independently 0 or an integer of 1 or more; each of m and n is independently 0, 1 or 2; $R^1$–$R^{19}$ are each independently a hydrogen atom, a halogen atom, an aliphatic hydrocarbon group, an alicyclic hydrocarbon group, an aromatic hydrocarbon group or an alkoxy group; a carbon atom to which $R^9$ or $R^{10}$ is linked and a carbon atom to which $R^{13}$ or $R^{11}$ is linked may be bonded directly or by way of an alkylene group of 1–3 carbon atoms and $R^{15}$ and $R^{12}$, or $R^{15}$ and $R^{19}$ may be linked together to form a monocyclic or polycyclic aromatic ring when each of n and m is 0.

3. The cycloolefin copolymer composition of claim 1 wherein the hydrocarbon elastomer (A-2) component is obtained by copolymerization of ethylene-α-olefin-diene hydrocarbons.

4. A cycloolefin copolymer composition comprising (A), a hydrocarbon elastomer (A-2) component obtained by copolymerization of
(i) an α-olefin of at least 2 carbon atoms and
(ii) a cycloolefin represented by the formula (I) or (II) and
(iii) a non-conjugated diene of 5–20 carbon atoms and having an intrinsic viscosity (η), as measured in decalin at 135° C., of 0.05–10 dl/g, a glass transition temperature (Tg) of less than 10° C., a polymerizable carbon-carbon double bond, and an iodine value of 2–30 (g-iodine/100g-polymer), and (B) a cycloolefin copolymer (B-2) component obtained by copolymerization of
(a) an α-olefin of at least 2 carbon atoms and
(b) a cycloolefin represented by the following formula (I) or (II),
wherein the copolymerization to obtain the cycloolefin copolymer component (B-2) is carried out in the presence of the hydrocarbon elastomer (A-2) component and the hydrocarbon elastomer (A-2) component is chemically bound to the copolymer (B-2) component, and
wherein said hydrocarbon elastomer (A-2) component exists in said composition in an amount of 1–50% by weight, and wherein said composition has improved impact resistance in comparison with the cycloolefin copolymer (B-2) component absent said elastomer component;

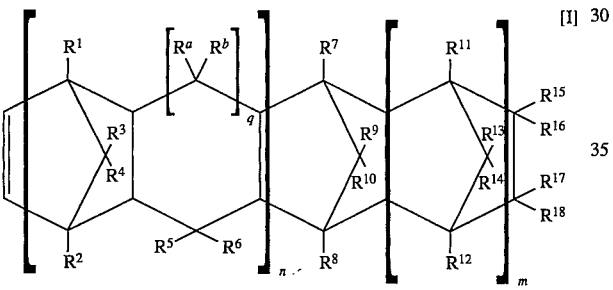
[I]

wherein n is 0 or 1; m is 0 or a positive integer; q is 0 or 1; $R^1$–$R^{18}$, $R^a$ and $R^b$ are each independently a hydrogen atom, a halogen atom or a hydrocarbon group; $R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group;

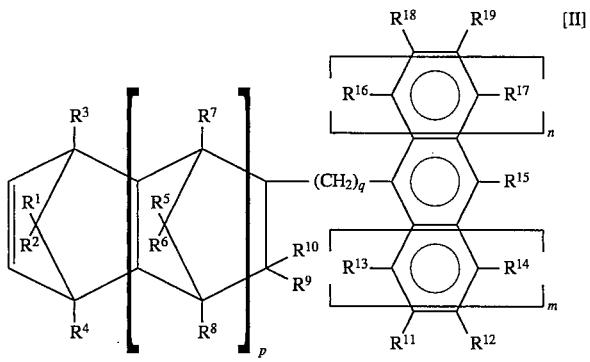
[II]

wherein each p and q is independently 0 or an integer of 1 or more; each of m and n is independently 0, 1 or 2; $R^1$–$R^{19}$ are each independently a hydrogen atom, a halogen atom, an aliphatic hydrocarbon group, an alicyclic hydrocarbon group, an aromatic hydrocarbon group or an alkoxy group; a carbon atom to which $R^9$ or $R^{10}$ is linked and a carbon atom to which $R^{13}$ or $R^{11}$ is linked may be bonded directly or by way of an alkylene group of 1–3 carbon atoms, and $R^{15}$ and $R^{12}$, or $R^{15}$ and $R^{19}$ may be linked together to form a monocyclic or polycyclic aromatic ring when each of n and m is 0.

* * * * *